(12) United States Patent
Wurz

(10) Patent No.: US 7,586,049 B2
(45) Date of Patent: Sep. 8, 2009

(54) APPARATUS AND METHOD FOR MEASURING THE WEIGHT OF ITEMS ON A CONVEYOR

(75) Inventor: David A. Wurz, Doylestown, PA (US)

(73) Assignee: Accu-Sort Systems, Inc., Telford, PA (US)

(*) Notice: Subject to any disclaimer, the term of this patent is extended or adjusted under 35 U.S.C. 154(b) by 0 days.

(21) Appl. No.: 12/047,922

(22) Filed: Mar. 13, 2008

(65) Prior Publication Data

US 2008/0164074 A1    Jul. 10, 2008

Related U.S. Application Data

(63) Continuation of application No. 11/501,585, filed on Aug. 9, 2006, now abandoned.

(51) Int. Cl.
 *G01G 19/00* (2006.01)
(52) U.S. Cl. ............... 177/25.13; 177/145; 702/155; 702/175; 705/407; 705/414
(58) Field of Classification Search ... 177/25.11–25.13, 177/25.18, 119, 145; 702/155, 175; 705/407, 705/414
See application file for complete search history.

(56) References Cited

U.S. PATENT DOCUMENTS

| | | | |
|---|---|---|---|
| 4,114,707 A | 9/1978 | Del Rosso | 177/145 |
| 4,609,059 A | 9/1986 | Pasterkamp | 177/50 |
| 4,709,770 A | 12/1987 | Kohashi et al. | 177/50 |
| 4,915,209 A | 4/1990 | Canziani | 198/357 |
| 4,929,843 A | 5/1990 | Chmielewski, Jr. et al. | 250/561 |
| 4,956,782 A | 9/1990 | Freeman et al. | 364/464.03 |
| 5,137,099 A | 8/1992 | Tolson | 177/5 |
| 5,184,733 A | 2/1993 | Arnarson et al. | 209/585 |
| 5,220,536 A | 6/1993 | Stringer et al. | 367/99 |
| 5,230,391 A | 7/1993 | Murata et al. | 177/50 |
| 5,246,118 A | 9/1993 | Mosher | 209/592 |
| 5,300,736 A | 4/1994 | Ehrhardt | 177/145 |
| 5,308,930 A | 5/1994 | Tokutu et al. | 177/25.13 |
| 5,326,938 A | 7/1994 | Tolson | 177/5 |
| 5,331,118 A | 7/1994 | Jensen | 177/25.14 |
| 5,340,950 A | 8/1994 | Brandorff et al. | 177/145 |

(Continued)

FOREIGN PATENT DOCUMENTS

DE      19618503       11/1997

(Continued)

OTHER PUBLICATIONS

United Kingdom Search Report dated Nov. 13, 2007.

*Primary Examiner*—Randy W Gibson
(74) *Attorney, Agent, or Firm*—Nelson Mullins Riley & Scarborough, LLP

(57) ABSTRACT

An apparatus for measuring the weight of items on a conveyor includes a scale that generates a first signal corresponding to the weight of the items. A movable platform transports the items to the scale and generates a second signal corresponding to position of the items in relation to the scale. A dimensioner examines the items and generates a third signal representative of whether the items are singulated or nonsingulated. A processor receives the second and third signals and determines whether to associate the first signal with information stored in memory about a particular item based upon whether the particular item is singulated or nonsingulated.

24 Claims, 7 Drawing Sheets

U.S. PATENT DOCUMENTS

| | | | |
|---|---|---|---|
| 5,547,034 A | 8/1996 | Wurz et al. ............... 177/25.13 |
| 5,585,603 A | 12/1996 | Vogeley, Jr. ............... 177/25.13 |
| 5,606,534 A | 2/1997 | Stringer et al. .............. 367/128 |
| 5,635,679 A | 6/1997 | Kohashi et al. .......... 177/25.13 |
| 5,661,561 A | 8/1997 | Wurz et al. ................. 356/386 |
| 5,689,092 A | 11/1997 | Wurz et al. ................. 177/145 |
| 5,699,161 A | 12/1997 | Woodworth ................ 356/379 |
| 5,770,864 A | 6/1998 | Dlugos ................. 250/559.19 |
| 5,793,652 A | 8/1998 | DeBarber et al. ........... 364/567 |
| 5,808,912 A | 9/1998 | Dlugos et al. ............... 364/562 |
| 5,814,772 A | 9/1998 | Nishimura et al. .......... 177/145 |
| 5,834,706 A | 11/1998 | Christ ............................ 177/1 |
| 5,850,370 A | 12/1998 | Stringer et al. .............. 367/128 |
| 5,900,611 A | 5/1999 | Hecht ......................... 235/454 |
| 5,909,013 A | 6/1999 | Dlugos ................... 177/25.11 |
| 5,923,428 A | 7/1999 | Woodworth ................ 356/375 |
| 5,949,031 A | 9/1999 | Vande Berg ................ 177/16 |
| 5,969,823 A | 10/1999 | Wurz et al. ................. 356/386 |
| 5,988,356 A | 11/1999 | Bonnet ....................... 198/598 |
| 5,990,422 A | 11/1999 | Komori et al. ........... 177/25.11 |
| 5,991,041 A | 11/1999 | Woodworth ................ 356/376 |
| 6,064,629 A | 5/2000 | Stringer et al. .............. 367/128 |
| 6,080,937 A | 6/2000 | Korthäuer et al. .............. 177/2 |
| 6,105,014 A | 8/2000 | Ramsden et al. ........... 705/410 |
| 6,137,577 A | 10/2000 | Woodworth ................ 356/376 |
| 6,177,999 B1 | 1/2001 | Wurz et al. ................. 356/386 |
| 6,189,702 B1 | 2/2001 | Bonnet ....................... 209/651 |
| 6,264,042 B1 | 7/2001 | Cossey, Jr. et al. .......... 209/559 |
| 6,286,656 B1 | 9/2001 | Huang et al. .............. 198/502.2 |
| 6,298,009 B1 | 10/2001 | Stringer ....................... 367/99 |
| 6,323,452 B1 | 11/2001 | Bonnet ....................... 209/583 |
| 6,359,238 B1 | 3/2002 | Ursu ............................ 177/1 |
| 6,382,515 B1 | 5/2002 | Good et al. ............. 235/472.01 |
| 6,408,223 B1 | 6/2002 | Skyum et al. ................ 700/213 |
| 6,433,288 B1 | 8/2002 | Olafsson ..................... 177/145 |
| 6,457,642 B1 | 10/2002 | Good et al. ............. 235/462.01 |
| 6,517,004 B2 | 2/2003 | Good et al. ............. 235/472.02 |
| 6,554,189 B1 | 4/2003 | Good et al. ............. 235/462.01 |
| 6,609,607 B2 | 8/2003 | Woltjer et al. .......... 198/457.03 |
| 6,611,787 B2 | 8/2003 | Stringer et al. .............. 702/159 |
| 6,616,048 B2 | 9/2003 | Good et al. ............. 235/472.02 |
| 6,619,550 B1 | 9/2003 | Good et al. ............. 235/472.01 |
| 6,639,156 B2 | 10/2003 | Luke et al. ............... 177/25.13 |
| 6,669,091 B2 | 12/2003 | Sharpe et al. .......... 235/462.12 |
| 6,690,995 B2 | 2/2004 | Prutu ......................... 700/228 |
| 6,705,526 B1 | 3/2004 | Zhu et al. .............. 235/472.01 |
| 6,705,528 B2 | 3/2004 | Good et al. ............. 235/472.01 |
| 6,775,011 B2 | 8/2004 | Gagliano .................... 356/601 |
| 6,775,012 B2 | 8/2004 | Wurz et al. ................. 356/608 |
| 6,783,068 B2 | 8/2004 | Hecht ......................... 235/435 |
| 6,786,404 B1 | 9/2004 | Bonner et al. ............... 235/385 |
| 6,825,423 B2 | 11/2004 | Eaton et al. .................... 177/1 |
| 6,850,464 B2 | 2/2005 | Carlsruh et al. ............... 367/99 |
| 6,861,592 B2* | 3/2005 | Gerstenberg et al. ........... 177/1 |
| 6,877,662 B2 | 4/2005 | Tsikos et al. ........... 235/462.01 |
| 6,896,184 B2 | 5/2005 | Tsikos et al. ................ 235/454 |
| 6,901,388 B2 | 5/2005 | Miller ........................ 705/407 |
| 6,907,409 B1 | 6/2005 | Huebler ...................... 705/415 |
| 6,917,924 B1 | 7/2005 | Ramsden et al. ............ 705/407 |
| 6,918,541 B2 | 7/2005 | Knowles et al. ........ 235/462.01 |
| 6,919,516 B2 | 7/2005 | Frye et al. ................ 177/25.13 |
| 6,952,628 B2 | 10/2005 | Prutu ......................... 700/228 |
| 6,953,151 B2 | 10/2005 | Tsikos et al. ........... 235/462.01 |
| 6,959,804 B2 | 11/2005 | Helgerson et al. ........... 198/805 |
| 6,959,868 B2 | 11/2005 | Tsikos et al. ........... 235/462.01 |
| 6,969,004 B2 | 11/2005 | Ralph et al. ............. 235/462.25 |
| 6,971,580 B2 | 12/2005 | Zhu et al. .............. 235/472.01 |
| 6,978,936 B2 | 12/2005 | Tsikos et al. ........... 235/462.01 |
| 6,983,883 B2 | 1/2006 | Ridling ....................... 235/385 |
| 7,000,839 B2 | 2/2006 | Good et al. ............. 235/462.14 |
| 7,012,210 B2 | 3/2006 | Kibbler et al. .............. 209/583 |
| 7,015,400 B2 | 3/2006 | Olafsson et al. ............. 177/119 |
| 7,017,730 B2 | 3/2006 | Mills et al. .................. 198/368 |
| 7,063,215 B2 | 6/2006 | Baranowski ................ 209/592 |
| 7,098,409 B2 | 8/2006 | Liang et al. .................... 177/1 |
| 7,104,454 B2 | 9/2006 | Good et al. ............. 235/462.24 |
| 7,118,034 B2 | 10/2006 | Baldassari et al. .......... 235/383 |
| 7,131,586 B2 | 11/2006 | Tsikos et al. ................ 235/454 |
| 7,143,943 B2 | 12/2006 | Tsikos et al. ........... 235/462.01 |
| 7,287,694 B2 | 10/2007 | Banavar et al. ............. 235/383 |
| 7,321,859 B2 | 1/2008 | Cooper et al. ................. 705/1 |
| 2002/0099454 A1 | 7/2002 | Gerrity ......................... 700/48 |
| 2003/0115160 A1 | 6/2003 | Nowlin et al. ............... 705/401 |
| 2004/0005080 A1 | 1/2004 | Hayduchok ................. 382/101 |

FOREIGN PATENT DOCUMENTS

| | | | |
|---|---|---|---|
| FR | 2792555 | 10/2000 | ..................... 5/20 |
| GB | 2224710 | 5/1990 | |

* cited by examiner

APPARATUS AND METHOD FOR MEASURING THE WEIGHT OF ITEMS ON A CONVEYOR

The present application is a continuation of U.S. application Ser. No. 11/501,585, filed Aug. 9, 2006 now abandoned, the entire disclosure of each of which is hereby incorporated by reference herein.

FIELD OF THE INVENTION

The present invention relates to conveyor systems and, more particularly, to conveyor systems in which items traveling on a conveyor are weighed.

BACKGROUND OF THE INVENTION

Generally, shipping companies determine an amount to charge for the transport of customer packages based on a relatively limited number of factors, including the package's weight, dimensions and distance to the shipping destination. If the customer expects a package to be delivered to the correct address, the customer is required to provide the shipping company with the correct destination, and there may be a relatively high degree of confidence, therefore, in revenue based on shipping distance and/or destination address. On the other hand, customers often will not have ready access to accurate information regarding the dimensions and weight of the packages they ship.

Particularly with the increase in use of online resources, shipping companies often allow customers to provide the weight, dimension, and destination of their packages prior to collection for shipment. Customers may provide such information through an Internet site or on a paper record attached to the package itself and then deposit the package in an unattended drop-off container from which the carrier retrieves the package. Packages may also be shipped through third-party storefronts or corporate shipping departments. The carrier may not check dimension and weight information for accuracy prior to collection. Thus, the revenue collected for such packages may be understated due to the discrepancy between the declared and actual weights and dimensions.

Systems are known that weigh and scan bar codes on packages in-motion on a conveyor system so that package weights can be compared against declared weights. Such systems may include an in-motion scale under a short section of moving conveyor disposed between an upstream main system conveyor and a downstream main system conveyor and a laser based bar code scanner located on the upstream or downstream main system conveyor or over the scale. The system also includes a dimensioner, a processor and a tachometer. As should be understood in this art, dimensioners detect one or more dimensions of an item on a conveyor. Various types of dimensioners are known, and it should be understood by those skilled in the art that dimensioners can be constructed in a variety of configurations, for example employing laser scanners that produce return signals describing the spatial configuration of an item passing proximate the dimensioner.

The tachometer is coupled to the upstream main system conveyor so that the conveyor's movement causes the tachometer to output pulses corresponding to the distance the conveyor moves and its speed. The dimensioner is disposed along the conveyor at a known position relative to the scale. When a package moving along the conveyor reaches the dimensioner, the dimensioner processor opens a package record, determines height, width and length, associates that data in the package record, and outputs the dimension data to the system processor in association with tachometer data that corresponds to the package's location at the dimensioner. Upon receiving the dimensioner data, the system processor opens a package record and associates with the package record the dimension and tachometer data received from the dimensioner. The system processor also sets an open read window variable and a close read window variable for the barcode scanner, and an open read window variable and a close read window variable for the scale. The open read window variable for the scale is equal to the tachometer value for the downstream-most point on the package, plus a known distance (in tachometer pulses) between the dimensioner and a predetermined position in the path of travel with respect to the scale. The close read window variable for the scale is equal to the tachometer value for the upstream-most point on the package, plus a known distance (in tachometer pulses) between the dimensioner and the predetermined position with respect to the scale. The open read window variable for the barcode scanner is equal to the tachometer value for the downstream-most point on the package, plus a known distance (in tachometer pulses) between the dimensioner and a predetermined position in the path of travel with respect to the barcode scanner. The close read window variable for the barcode scanner is equal to the tachometer value for the upstream-most point on the package, plus a known distance (in tachometer pulses) between the dimensioner and the predetermined position with respect to the barcode scanner.

The scale may have a generally planar top surface over which the conveyor belt passes. As a package moves over the scale, the package weighs down onto the scale's top surface such that one or more load cells depressed by the scale's top surface generate signals to the processor corresponding to the package's weight. The scale assembly has a photodetector disposed along the short conveyor immediately upstream from the scale. A processor on the scale monitors the photodetector's output signal and thereby determines when the package's front and back edges pass the photodetector. The scale also receives the tachometer output. By associating the passage of the package's front and back edges by the photodetector with the tachometer values corresponding to those events, the scale processor determines the package's length. The rate at which the tachometer outputs pulses to the scale determines how fast the package is moving through the path of travel, and this, along with package length, determines the time following its passage by the photodetector at which the package will have been on the scale a sufficient time for the scale to validly acquire the package's weight. The scale processor accordingly determines when valid weight data may be acquired for the package and acquires the weight data at that point.

The scale processor transmits weight data to the system processor when a package reaches a predetermined point in the path of travel following the scale. More specifically, the scale processor knows when the front edge of the package passes by the scale photodetector. After acquiring the package's weight at a point based on the package's length and belt speed, the scale processor holds the weight data until a tachometer value the scale associates with the weight data based on the photodetector signal accumulates to a point indicating that the front edge of the package is at a predetermined point downstream of the scale. The scale processor then outputs the weight data to the system processor.

The system processor relies on tachometer pulses to correctly associate weight data with a package record. The system processor determines the accumulated tachometer value at the time the weight data is received from the scale processor. The open read window and close read window scale variables for each package record correspond to the distance between the dimensioner and the predetermined point downstream from the scale. Thus, the system processor compares the tachometer value associated with the received weight data with the open read window and close read window variables for the open package structures it maintains. If the tachometer value is between the open read window scale variable and close read window scale variable for any open package record (because the scale processor transmits weight data when the package's leading edge reaches the predetermined point, the tachometer value should be near the open read window scale variable), the system processor assigns the weight data to that package record. If the tachometer value does not fall within the open window and close window scale variables stored for any open package record, the weight data is not assigned to a package record.

As should be understood in this art, a barcode reader may comprise a laser scanner that projects a plurality of laser lines on the belt, for example in a series of "X" patterns. The scanner outputs a signal that includes barcode information reflected back from the laser lines and a barcode count, which indicates the position in the X patterns at which given barcode information was seen. Thus, the barcode count provides the lateral position on the belt, and the longitudinal position with respect to the centerline of the X patterns, corresponding to the barcode information. The barcode scanner assembly has a photodetector disposed along the short conveyor immediately upstream from the X patterns. A processor at the barcode scanner assembly monitors the photodetector's output signal and thereby determines when the package's front and back edges pass the photodetector. The barcode scanner also receives the tachometer output. By associating the passage of the package's front and back edges by the photodetector with the tachometer data, the barcode scanner processor determines when the package passes through the X patterns. The barcode scanner processor accordingly determines when valid barcode data may be acquired for the package, acquires the barcode data during that period.

The barcode processor accumulates barcode data while a given package passes through the X patterns and transmits the accumulated barcode data to the system processor when the package reaches a predetermined point in the path of travel following the barcode scanner. More specifically, the barcode scanner processor knows when the front edge of the package passes by the barcode scanner photodetector. After acquiring the package's barcode data over a period based on the package's length, the barcode scanner processor holds the barcode data until a tachometer value the barcode scanner processor associates with the barcode data accumulates to a point indicating that the front edge of the package is at the predetermined point downstream of the scanner. The predetermined point is defined so that the longest package the system is expected to handle can clear the scanner's X patterns. The barcode scanner processor then outputs the barcode data to the system processor.

The system processor relies on tachometer pulses to correctly associate barcode data with a package record. The system processor determines the accumulated tachometer value at the time the barcode data is received from the barcode scanner processor. The open read window and close read window barcode variables for each package structure correspond to the distance between the dimensioner and the predetermined point downstream from the barcode scanner. Thus, the system processor compares the tachometer value associated with the received barcode data with the open read window and close read window barcode variables for the open package structures it maintains. If the tachometer value is between the open read window barcode variable and close read window barcode variable for any open package structure, the system processor assigns the barcode data to that package record. If the tachometer value does not fall within the open window and close window barcode variables stored for any open package record, the barcode data is not assigned to a package record.

Such known systems are operable with items that do not overlap with respect to the conveyor's direction of travel. The scale photodetector detects gaps between the items, and even where the gaps are short enough that there are first periods in which two items are simultaneously on the scale, if there are second periods of time in which respective items are on the scale alone for a time sufficient to allow the scale to settle, valid weight data may be acquired.

In the operation of conveyor systems processing non-overlapping items, it is known that the items may become overlapped in certain circumstances, for example when a sudden increase in items received at a receiving station cause human operators to load items on the conveyor at a rate higher than that necessary to maintain item separation. If the items become overlapped, multiple items may be on the scale when the processor receives weight data, and the weight data is therefore unreliable and unusable. Thus, it is known to provide a switch that discontinues the communication of weight data from the scale to the processor so that a human operator detecting an overlapped condition can manually interrupt the weighing function.

It is known to dispose a dimensioner at a predetermined position upstream from a barcode scanner within a conveyor system that carries overlapping items and that does not include a scale, where the dimensioner is configured to determine the position and orientation of each item, for example a package, on the conveyor belt and, based on expected package shapes, whether packages are adjacent each other. The distance, and therefore the number of tachometer pulses corresponding to the distance, between the dimensioner and the centerline of the barcode scanner's X pattern is known, and the dimensioner uses this distance to define the four corners of each package as it relates to the position of the center of the scanner's X pattern.

The tachometer values are synchronized between the system processor and the barcode scanner processor, so that both processors accumulate the same tachometer value. The barcode scanner's processor constantly monitors incoming barcode data and outputs the data as it is received, along with the accumulated tachometer value, a variable that identifies the particular leg, or scan line, of the X pattern in which the barcode was read, and the relative barcode count, to the system processor. The system processor subtracts from the tachometer value associated with the received barcode data a tachometer value corresponding to the longitudinal offset represented by the barcode count, thereby normalizing the tachometer value to the centerline of the X pattern. Based on the adjusted tachometer value and the barcode's lateral position, the system processor determines whether the barcode falls within the four corners of any package (accounting, as discussed above, for the longitudinal distance between the dimensioner and the barcode scanner), taking into consideration the package's height if the barcode were to have been read on that package. As should be understood in this art, package height determines the size of the X's in the X pattern seen by the barcode scanner, and the package height is therefore needed to accurately determine the barcode's normalized tachometer value and lateral position. If, following adjustment for package height, the location of the barcode falls within the four corners of a package, the system processor assigns the barcode data to that package record. If the barcode data does not match any open package record, the barcode data is not assigned to a package record.

SUMMARY

The present invention recognizes and addresses the foregoing considerations, and others, of prior art constructions and methods.

These and/or other objects are achieved in a preferred embodiment of an apparatus for measuring the weight of items on a conveyor, including a scale that generates a first signal corresponding to the weight of items as they pass over the scale. A movable platform transports the items to the scale and generates a second signal corresponding to a position of the items in relation to the scale. A dimensioner examines the items transported on the platform and generates a third signal representative of whether the items are singulated or nonsingulated. A processor operatively connected to the scale, the dimensioner, a memory and the platform receives the second and third signals and determines whether to associate the first signal with information about a particular item based upon whether the particular item is singulated or nonsingulated.

In another preferred embodiment, an apparatus for measuring the weight of items on a conveyor includes a conveyor that moves the items in a direction in a path of travel. A scale is disposed in the path of travel so that the scale receives the items moving on the conveyor and outputs a first signal corresponding to a weight of items received by the scale. A dimensioner is disposed proximate the conveyor. The dimensioner has a signal source that outputs a second signal with which the items interact as the items move along the path of travel so that when a first item interacts with the second signal, the second signal carries information corresponding to at least one spatial dimension of the first item. The dimensioner produces a third signal that includes the information. A processor receives the first signal and the third signal and determines, based on the information, a location of a boundary of the first item in the path of travel and relative to locations of boundaries of other items in the path of travel proximate the first item. The processor determines, based on the location of the boundary of the first item in the path of travel, when the first signal corresponds to receipt of the first item by the scale. The processor detects, based on the location of the boundary of the first item with respect to the locations of the boundaries of other items proximate the first item, a first condition in which the boundary of the first item overlaps, relative to the direction, a boundary of another time that is received by the scale and a second condition in which the boundary of the first item does not overlap, relative to the direction, the boundary of another item that is received by the scale. Upon determining that the first signal corresponds to receipt of the first item by the scale, the processor associates a weight defined by the first signal with a record corresponding to the first item based upon detection of the second condition and does not associate the weight defined by the first signal with the record when the processor detects the first condition.

One preferred embodiment of a method for measuring the weight of items being moved on a conveyor in a direction in a path of travel includes providing a scale disposed in the path of travel so that the scale receives the items moving on the conveyor and outputs a first signal corresponding to a weight of items received by the scale. At least one spatial dimension of a first item is determined. Based on the at least one spatial dimension, a location of a boundary of the first item in the path of travel, and relative to locations of boundaries of other items in the path of travel proximate the first item, is determined. Based on the location on the boundary of the first item in the path of travel, it is determined when the first signal corresponds to weight of the first item. Based on the location of the boundary of the first item with respect to the locations of boundaries of other items proximate the first item, first and second conditions are detected, where in the first condition the boundary of the first item overlaps, relative to the direction, a boundary of another item that is received by the scale, and in the second condition, the boundary of the first item does not overlap, relative to the direction, the boundary of another item that is received by the scale. Upon determining that the first signal corresponds to receipt of the first item by the scale, a weight defined by the first signal is associated with a record corresponding to the first item based upon detection of the second condition but is not associated with the record if the first condition is detected.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
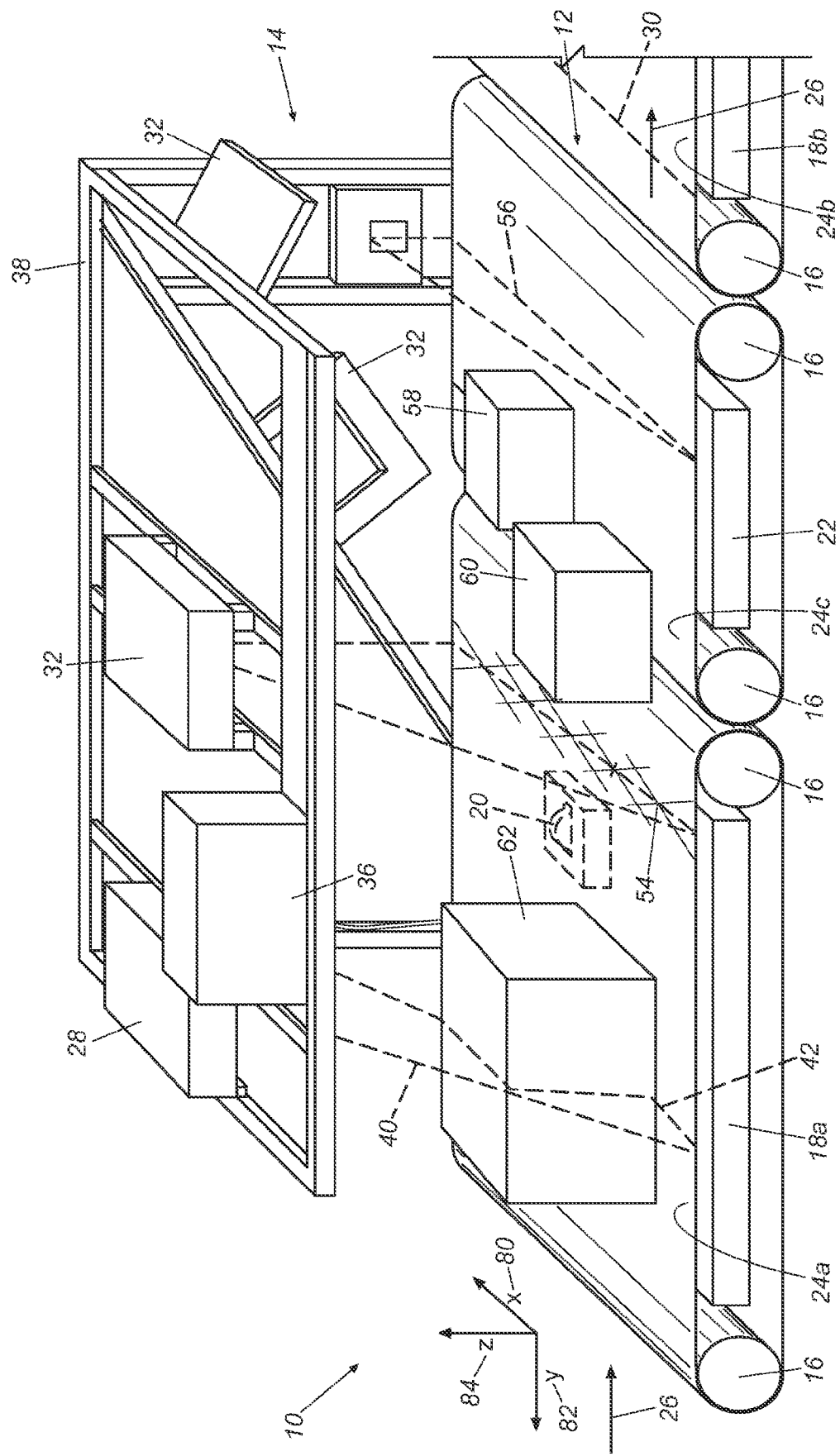
FIG. 1 is a schematic representation of a dynamic dimensioning and weighing system in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Additional aspects and advantages of the invention will be set forth in part in the description which follows and, in part, will be obvious from the description, or may be learned by practice of the invention.

Referring to FIG. 1, a dynamic dimensioning and weighing system 10 includes a conveyor system 12 that moves items (generally rectangularly-cross-sectioned packages in the illustrated embodiments) along a path of travel and weighs the items and a component system 14 adjacent to the conveyor system that tracks packages being moved by the conveyor system. Conveyor system 12 includes a number of rollers 16, an upstream main belt 24a, a downstream main belt 24b, a short intermediate belt 24c, respective beds 18a and 18b, a tachometer 20, and a scale 22 disposed beneath and in contact with intermediate belt 24c. Although in the illustrated embodiments the conveyor includes a belt, it should be understood that the conveyor can move the items through the path of travel by means other than belts, for example driven rollers.

Rollers 16 are motor-driven rollers that move conveyor belts 24a-24c in a direction denoted by arrows 26 through their rotation over beds 18a and 18b, which provide support to the belts, and scale 22. For purposes of the present discussion, the direction corresponding to the start of conveyor system 12 is referred to as "upstream," whereas the direction in which conveyor belts 24 moves is referred to as "downstream."

Tachometer 20 is beneath and in contact with the surface of upstream main conveyor belt 24a and rotates with belt 24a as the belt moves in the direction of arrows 26. As tachometer 20 rotates, it outputs a signal comprising a series of pulses corresponding to the conveyor belt's linear movement and speed. Tachometer 20, and other devices that provide signals corresponding to the rate of movement of a conveyor belt, from which the locations of items moving in a path of travel along the belt can be determined, should be understood by those of ordinary skill in the art. In general, the number of pulses output by tachometer 20 corresponds to the linear distance traveled by the belt, while pulse frequency corresponds to the belt's speed. The number of tachometer pulses per unit of measurement defines the resolution of the tachometer and its ability to precisely measure the distance that the conveyor belt has moved. Tachometer 20 may be replaced by a shaft encoder, particularly where less accurate measurements are needed.

Figure 2:
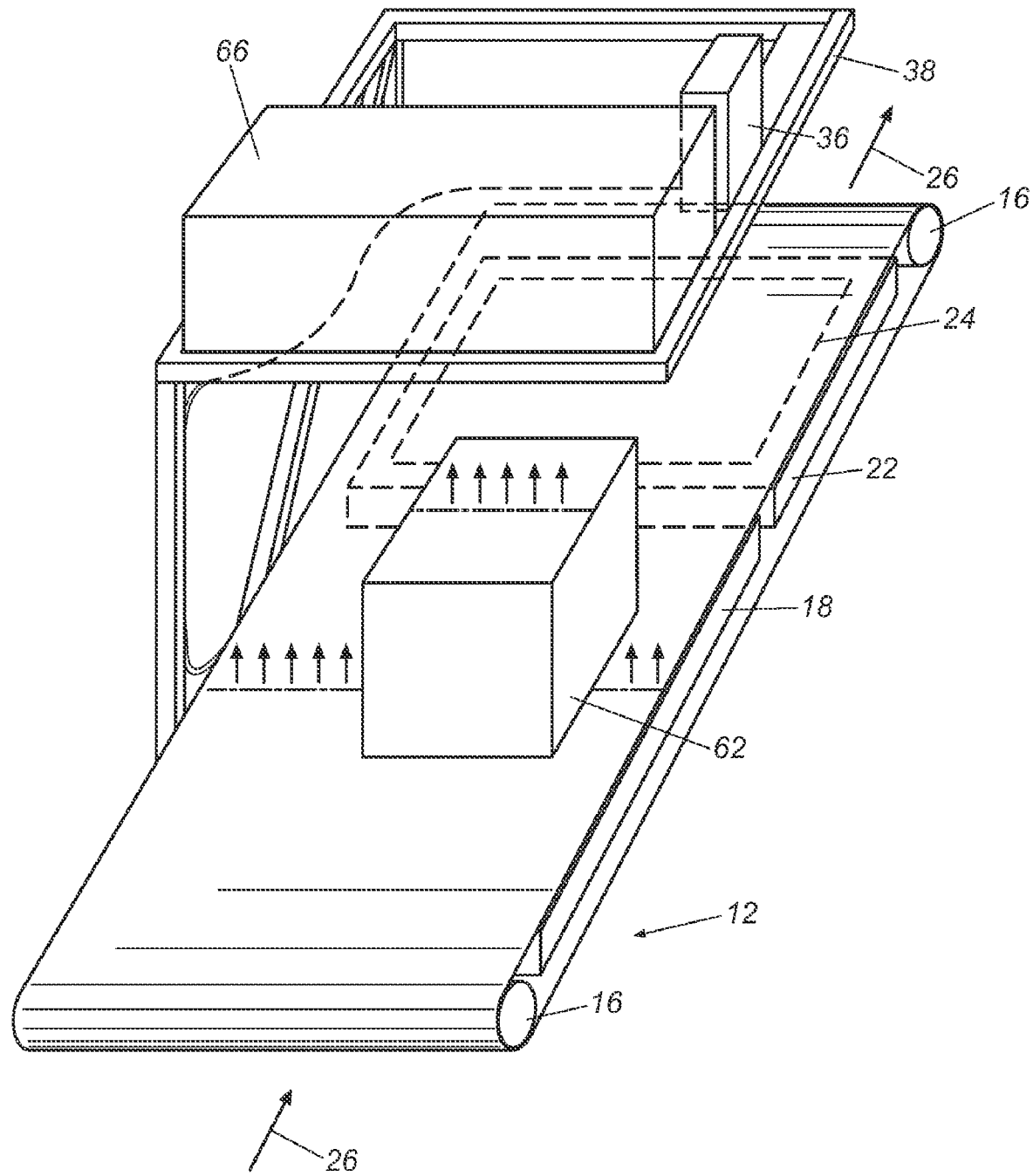
FIG. 2 is a schematic representation of a dimensioner of a dynamic dimensioning and weighing system in accordance with an embodiment of the present invention.

Scale 22 is located beneath and in contact with conveyor belt 24c so that packages being moved by the belt in the path of travel apply pressure to the scale as they move over the scale. Scale 22 extends substantially across the path of travel so that any item carried by the belt through the path of travel passes over the scale. The signal output by the scale corresponds to the weight applied to the scale. In one embodiment, scale 22 is a IM6000 in-motion scale, manufactured by Fairbanks Scales, Inc. of Kansas City, Mo. Scale 22 is illustrated schematically in FIG. 1 as a single unit, but it should also be understood that the scale may be formed from several scales either in parallel and/or series along the length of conveyor system 12. Furthermore, where scale 22 is not part of an assembly having a discrete belt 24c, scale 22 may be disposed under and in contact with a continuous belt in place of separate belts 24a, 24b and 24c. In general, the system operates in such a configuration (such as shown in FIG. 2) in the same manner as described below. For example, the system and component processors perform the same functions and exchange the same information. Thus, the single belt embodiment is not discussed in further detail with respect to FIG. 1, and it should be understood that while given embodiments described herein may have either a scale with a separate belt or a scale that engages the main system belt, this is for purposes of example only and that the present invention may encompass either and other arrangements of belts, as well as other conveyors, in various combinations of features. Various suitable scale configurations are also described in more detail below.

Component system 14 includes a dimensioner 28, a plurality of barcode scanners 32, and a computer 36, all of which are attached to a frame 38. Frame 38 supports dimensioner 28 and at least one barcode scanner 32 horizontally above conveyor belt 24 so that the beams of light emitted by the dimensioner and scanners (described below) intersect the top surface of packages moved by the belt. Frame 38 also supports additional scanners 32 vertically adjacent to conveyor belt 24 so that beams of light emitted by these scanners intersect the sides of packages moved by the belt. One example of suitable scanners include QUAD X laser barcode scanners manufactured by Accu-Sort Systems of Telford, Pa., although it should be understood that cameras or other suitable barcode readers could be used, depending on the needs of a given system.

Dimensioner 28 may be of any suitable type, for example a "time-of-flight" type dimensioner, a "triangulation" type dimensioner, or a camera. In the embodiment shown in FIG. 1, dimensioner 28 is a triangulation type dimensioner similar to those disclosed in U.S. Pat. Nos. 6,775,012, 6,177,999, 5,969,823, and 5,661,561, the entire disclosures of which are incorporated by reference herein. With regard to these embodiments, dimensioner 28 comprises a light source disposed within the dimensions, such as a laser, and a rotating reflector disposed within the dimensioner that produce a scanning beam (denoted in phantom at 40) that is directed down at conveyor belt 24a. Scanning beam 40 intersects belt 24a at line 42 in a manner that is transverse to the belt's linear movement in the path of travel at a fixed angle with respect to an axis normal to the belt's surface. Packages moving on belt 24a, such as package 62, intersect scanning beam 40, thereby creating an offset in the scanning beam in the y-direction.

Both conveyor belt 24a and the packages thereon reflect light created by the scanning beam back to the rotating mirror, which reflects light to a line scan CCD or CMOS imager (not shown) within dimensioner 28. Because the rotating mirror reflects both the outgoing and reflected laser light, the mirror returns the reflected light to a constant x-axis position, but the reflected light shifts in the y-direction correspondingly to the shift in line 42 caused by the height of a package 62 and the angle at which the scanned laser beam intersects the belt. Thus, the line scan CCD or CMOS imager is aligned in the y-direction to thereby detect the return light's y-axis shift. The rotating mirror's angular position corresponds to the x-axis position of any given height data point. Accordingly, dimensioner 28 generates a signal representative of the height of an object such as package 62 across conveyor belt 24a as described by the y-axis offset detected in scanning beam 40. The signal is also representative of the x-axis positions of the height data by association of that data with the mirror's angular position. Based on the height data and corresponding x-axis data, the dimensioner processor (not shown) determines the cross sectional height profile an object on the belt and, by accumulating such profiles along the object's length, the object's three dimensional profile, as described in more detail below. Furthermore, because the dimensioner is disposed at a fixed position with respect to the belt, the dimension data defines the package's orientation on the belt. Given certain assumptions regarding the package's height and/or other dimensions appropriate to a given system, the dimensioner processor can determine the state of the packages, i.e. whether packages are singulated or non-singulated.

For purposes of this discussion, packages in a "singulated" line are placed on the belt serially with spaces between the packages sufficient to allow packages to be weighed individually by scale 22. A non-singulated group of packages occurs when the packages are placed on the belt adjacent to, alongside and/or otherwise sufficiently physically close to each other so that a given package cannot be weighed individually by scale 22. For example, in FIG. 1, package 62 is singulated with respect to packages 58 and 60, but packages 58 and 60 are non-singulated with respect to each other since they are partially side-by-side across the width of the belt. Packages 58 and 60 would also be considered non-singulated if the back end of package 58 and the front end of package 60 were spaced apart such that neither would be isolated on scale 22 as the packages pass over the scale for a sufficient time to allow the scale to acquire an accurate weight.

In another embodiment (not shown), dimensioner 28 is a "time-of-flight" type dimensioner that produces a scanning beam similar to scanning beam 40 (FIG. 1). A time-of-flight type dimensioner may also include a light source, such as a laser beam, and a rotating reflector similar to the triangulation type dimensioner described above with reference to FIG. 1. The scanning beam emitted by a time-of-flight type dimensioner, however, is projected perpendicularly onto conveyor belt 24a (FIG. 1) at a right angle transverse to the belt's movement. The beam is reflected by belt 24a and any packages moving on the belt back to receivers within the dimensioner. Based on the received reflected light and the time it takes to reach the detector, the dimensioner processor determines the height of objects on the belt, the package's width and length dimensions, the package's orientation on the belt, and the package's state (singulated versus non-singulated) with respect to other packages moving through the path of travel on conveyor belt 24a. Time-of-flight type dimensioners should be known by those of ordinary skill in the art and are, therefore, not discussed in further detail. Examples of such "time-of-flight" dimensioner are CS900 and CS5200 dimensioners manufactured by Mettler Toledo of Columbus, Ohio.

In yet another embodiment as shown in FIG. 2, dimensioner 28 (FIG. 1) is replaced by a camera 66 disposed above a conveyor belt 24 in a manner similar to dimensioner 28 as described with reference to FIG. 1. The camera contains a line scan or area CCD or CMOS imager disposed within camera 66, the field of view of which corresponds to the entire width of conveyor belt 24. A light source disposed within camera 66 directs light toward conveyor belt 24 at the area directly under camera 66. Packages transported by conveyor belt 24 reflect the light as they pass under the camera. Camera 66 receives the light reflected by the packages and identifies packages on conveyor belt 24 based on the contrast in light between conveyor belt 24 and any packages on the belt. Camera 66 transmits a signal corresponding to the contrast pattern of received light, which can be used to determine the perimeter of the packages traveling on belt 24. Given assumptions regarding package shape in the x- and y-directions as appropriate to a given system, the dimensioner processor determines from this information a package's state on the conveyor—i.e., whether the package is singulated or non-singulated with respect to other packages. If the system does not include a mechanism to determine the package height, the camera data may not provide an accurate measurement of a package's length and width, but the state of the packages can generally be determined from the signal received from camera 66 because the camera data nonetheless describes package perimeter shapes, and the processor is therefore capable of determining whether a sufficient gap exists between each pair of packages to establish a singulated condition under the constraints of that system. Cameras containing CCD or CMOS imagers, or other devices capable of detecting light reflected from packages moved by conveyor system 12, should be well-known by those of ordinary skill in this art and are, therefore, not discussed in further detail. It should be appreciated that these types of cameras do not, in and of themselves, provide height data and are preferably used in instances where knowledge of the packages' height is unnecessary or provided by other means.

One of ordinary skill in this art should recognize that other dimensioning devices could be employed within the present invention, as long as these devices are capable of determining at least whether items on the conveyor are singulated or non-singulated based on the requirements of the system or of providing information from which singulation can be determined. Preferably, the dimensioner processor or the system processor should be able to determine from the dimension data the height, width and length of packages moved by conveyor system 12 as well as the location and orientation of the package on the conveyor. This information can be used in turn to determine whether the packages on conveyor belt 24 are singulated or non-singulated. Notwithstanding the type of dimensioner used in the system, the output signal generated by the dimensioner preferably defines at least the boundary of the package and its location with respect to that of adjacent packages or sufficient data from which this can be determined. This information defines whether packages are singulated or non-singulated and therefore whether the downstream scale is capable of associating an accurate weight measurement with each discrete package.

Referring again to FIG. 1, barcode scanner 32 emits a scanning beam downward onto conveyor belt 24 generally along a line 54 perpendicular to the belt and scans the top of packages moved by conveyor belt 24 downstream through line 54 for any barcodes. The scanning beam consists of a series of laser-line X's allowing the scanner to read a barcode positioned in any orientation. Barcode scanner 32 outputs a signal corresponding to any barcode symbols read by the scanner. The barcode scanner processor outputs this data to the system processor, along with a variable that identifies the laser scan line (i.e. which leg in a given X pattern) by which the barcode was read and a relative barcode count that identifies the location at which the barcode was detected in that laser scan line. Because the lateral position (i.e. in the x-direction) on the belt of each laser scan line segment is known, the barcode count identifies the barcode's lateral position across the conveyor's width. The barcode count also provides the longitudinal offset between the position at which the barcode is detected and line 54. As described below, the relative barcode count is used to associate the barcode information with a particular package on the conveyor belts 24a-24c, in association with the height of the package.

It should be understood that any suitable, and preferably omnidirectional, barcode reader (e.g. a laser scanner or a camera) capable of reading barcode symbols on the packages' top surface may be used. The construction and operation of such barcode readers are not, in-and-of-themselves, part of the present invention, and a more detailed discussion is therefore omitted. Moreover, those skilled in the art should understand that other systems for reading data disposed on packages, such as radio frequency identification tag readers and antennas for reading radio frequency tags, may be used in the present system. Depending on the requirements of system 10, additional barcode scanners 32 may be placed on frame 38 to scan and read barcodes located on the packages' side or front surfaces or appearing in different orientations on the packages as they are moved downstream by conveyor belt 24.

Computer 36, which is operatively connected to tachometer 20, scale 22, dimensioner 28, barcode scanner 32 and a host system (not shown) used for inventory tracking and other purposes, is a general purpose computer that includes a processor, memory, a storage device and other components that should be understood. The structure of computers should be well-known in the art and is, therefore, not discussed in more detail. Furthermore, it should be understood by one of ordinary skill in the art that, although computer 36 is depicted as supported by frame 38 horizontally above conveyor belt 24 in FIG. 1, the computer can be placed almost anywhere within a facility as long as it is operatively connected to the above-listed components. Moreover, it should also be understood that computer 36 may be connected to the above components by a wired or wireless connection as long as the computer is able to receive the signals transmitted by each component. In the alternative, computer 36 may also be a central computer that receives signals from multiple component systems 14 placed throughout a facility. Still further, it should be understood that the functions described herein as performed by the processors located in the dimensioner, barcode scanner and scales could be performed by computer 36.

Computer 36 receives the signal transmitted by tachometer 20, which contains pulses generated by the tachometer relating to the downstream movement of conveyor belt 24a. As the pulses correspond to the belt's linear movement, computer 36 uses the pulses to selectively track the position of packages on conveyor belt 24a. Since belt's 24b and 24c run at approximately the same speed as belt 24a, computer 36 also relies on the signal from tachometer 20 to track packages on belts 24b and 24c. Computer 36 extracts pulse data each time a signal is transmitted to the computer by tachometer 20 and maintains and updates a global tachometer value upon receipt of each signal. This global tachometer value is a running count of tachometer pulses from a start point synchronized to the other processors in the system. It should be understood that the tachometer pulse may be received by computer 36 either directly from the tachometer or indirectly by one or more of the dimensioner and scanner processors that use the tachometer data in conjunction with the signals generated by those devices. In either case, computer 36 uses the information from the tachometer to track the position of packages carried by the system.

Because tachometer 20 produces a signal containing tachometer pulses having a known relationship to the movement of conveyor belt 24a, and these pulses are equivalent to the distance moved by the belt, the relative distances between fixed locations along conveyor system 12 can be, and are, predefined in tachometer pulses. Computer 36 can initialize (set to 0) any point along conveyor system 12 with regard to tachometer pulses, thereby making that point a reference point. At any moment, all other locations along conveyor belt 24 can be defined relative to the reference point by adding (if the other location is downstream) or subtracting (if the other location is upstream) the known distance in tachometer pulses from the position of the other locations from the reference point.

For example, if a location on conveyor system 12 is initialized as the reference point and set to a value of 0, a location along conveyor system 12 in the path of travel downstream from the reference point by a distance equivalent to ten tachometer pulses would have a relative distance value of 10, which is referred to herein as "RDV." It should be understood by one skilled in the art that any location along the path of travel can be chosen to be the reference point. For explanation purposes, line 42 is chosen in the ensuing discussion as the reference point and, thus, is associated with an RDV of 0. One of ordinary skill in the art should also realize that the RDV of each fixed location along conveyor system 12 discussed herein as a downstream reference line or point in relation to the reference point of line 42 is known by computer 36 and stored in memory prior to the operation of system 10.

Computer 36 initiates package records, with which package information is thereafter associated as a package travels through system 10, based on information provided by dimensioner 28. Dimensioner 28 initiates identification of a given package when the package interrupts the dimensioner's scanning beam at line 42. More specifically, as the dimensioner receives reflected light from scanning beam 40 indicating presence of a height greater than zero (i.e. a height above the plane of the belt), the dimensioner processor populates a two-dimensional data array, the first dimension corresponding to the width of the conveyor belt and the second to the relative length of packages moving along the belt. The number of data points in an array line corresponds to the number of samples taken across the width of the belt, which is defined by the dimensioner's sampling rate. Height data for a given sample is stored in a cell in the array. Height values correspond to the vertical axis indicated as the z-axis (denoted at 84 in FIG. 1), and the location at which the height value was received with respect to the conveyor's width corresponds to the horizontal axis indicated as the x-axis (denoted at 80 in FIG. 1). The dimensioner processor begins to create a three-dimensional model of each package with the accumulation of these array data points over a period of time. Each line of array data is accrued in the direction corresponding to the conveyor's linear movement indicated as the y-axis (denoted at 82 in FIG. 1). The dimensioner's resolution in the x direction is determined by the speed of the dimensioner's rotating mirror and its sampling rate, and in the y direction by mirror speed and belt speed.

As described above, the dimensioner creates scanning beam 40 by directing a point source at a rotating mirror so that the resultant beam directed to the belt is effectively a scanned beam of light across the width of the belt. For purposes of this discussion, a scan represents the capture of data across the belt's width for a particular position of the package along y-axis 82. A scan extends entirely across the belt in the direction of x-axis 80, and so each scan in each package data array includes the same number of data points. The number of data points representative of the length of a given package, however, is determined by the number of scans taken along y-axis 82 in which the package intersects a portion of the scanning beam. Consequently, as long as some portion of a package intersects the dimensioner's light beam, height values are stored in the array at a corresponding x- and y-axis array cell. Every location in the array that has a height value greater than zero corresponds to a position at which the package is present, and the dimensioner processor uses this data to define the package's perimeter and the location of this perimeter on the conveyor belt.

By way of analogy, consider a piece of graph paper broken into a plurality of squares across the width and length of the paper and aligned so that rows of squares extend transversely across the belt in the x-direction and columns extend longitudinally in the y-direction. Each square represents a data point where height information may be stored. The width of the graph paper is proportional to the width of the conveyor belt. At each point across the belt where a package intercepts the dimensioner's scanning beam, non-zero height data is entered into a corresponding "box" on the "graph paper," along with the lateral position at which the height data was read as determined by the rotational position of the dimensioner mirror and the longitudinal position at which height data was read, defined by the global tachometer value at that time. Once the package moves past the dimensioner, the array is filled with data, and the boxes containing height information collectively define the package's two dimensional footprint. The value for the height at each point provides the third dimension of the package. Thus, each data array is representative of a portion of the conveyor belt on which a package is disposed.

The dimensioner processor retrieves from its memory the dimensioner's RDV, which is determined by the location at which the dimensioner's scanning beam intersects conveyor belt 24. Since the scanning beam intersects conveyor belt 24 at line 42 (the assumed reference point for this explanation), the dimensioner's RDV is 0. The dimensioner processor creates a space in its memory to store the three-dimensional array of each package and assigns an "initial tachometer value" variable to each data cell in the array as the height data is stored. Each point's initial tachometer value is set to the system global tachometer value (which is accumulated by the dimensioner processor from a synchronized value provided by the system processor) minus the dimensioner's RDV value (in this instance, zero).

In operation, packages, such as packages 58, 60, and 62, are loaded on conveyor belt 24a upstream from component system 14. Rollers 16 rotate to move conveyor belt 24a and packages 58, 60, and 62 in the direction of arrows 26 downstream over bed 18. When package 62 reaches line 42 and interrupts dimensioner scanning beam 40, the dimensioner processor calculates height and stores the data in the corresponding two-dimensional data array.

The dimensioner processor sequentially examines each line of array data representative of a scan across the width of the belt (i.e. in the x-direction), starting at one edge of the belt and moving toward the other. Assuming a condition in which the processor does not presently detect the presence of a package (e.g. either having detected no-nonzero height since starting or having detected no non-zero height since detecting the end of a previous package), if a point in the array along x-axis 80 has a height value (z-axis 84) greater than zero, and the corresponding point in the previous array line having an identical x-axis value had a height of zero, the dimensioner processor creates a new package data structure within its memory indicating the presence of a new package.

The dimensioner processor initially assigns all subsequent array positions to that package data structure until a package end is detected. For example, and referring to FIG. 5, dashed lines 68a, 68b, 68c, 68d, 68m, 68n and 68o represent data points in sequential scans extending across the x-axis. It should be understood that scans occur between scans 68d and 68m but are omitted for purposes of clarity and that the resolution of the scans is greater than indicated in the Figures. Assuming scan 68a occurs in a condition in which no package data structure is open, the dimensioner processor opens a new package data structure upon detecting a non-zero height at 70 in scan 68b, after having detected a zero height at the same x-axis position in scan 68a.

The dimensioner processor thereafter assigns to the package data structure all height data, whether zero or non-zero, in scan 68b, 68c, 68d and later scans. Note that because a package structure is open when the computer detects a transition from zero to non-zero heights (e.g., at point 72) for which the x-axis position in the previous scan had a zero height, the dimensioner does not open a new package structure. Upon detecting a scan 68o having all zero values, the dimensioner processor closes the package structure, determines the package's perimeter, assesses whether multiple packages are present, assigns array data for multiple packages to respective package structures, and outputs the package structure(s) to system computer 36. The next detected non-zero value begins a new package structure, and the process repeats.

The assignment of the global tachometer value (minus the constant RDV) to a given point in the package structure within the location of the package defines the location of that point in the path of travel in this example because, as described below, the system defines locations of the various system components in the path of travel with respect to each other in terms of tachometer data. In combination with the lateral position information, the tachometer data also defines the location of the package boundaries with respect to each other.

The dimensioner processor distinguishes between or among multiple packages in an array by analysis of one or more boundaries of the packages, for example a perimeter of the packages in the plane parallel to the belt. In a preferred embodiment, system 10 is used with conveyor lines expected to carry rectangular-shaped packages preferably having a relatively consistent height across the package top. The dimensioner scans the belt for height data as described above and, upon closing the package structure, the processor examines each lateral scan and identifies every series of consecutive points having a generally uniform non-zero height. As should be understood in this art, predictable irregularities in the box surface, e.g. depressions, loose tape or deformations in the package material, provide less of a transition than a box edge, and the algorithm therefore includes filters to ignore such irregularities in defining the segments. If an irregularity is beyond these predicted parameters, however, the dimensioner processor sets a flag in the package record to notify the system processor that valid dimension data was not obtained. Computer 36 then does not assign weight data to the corresponding package structure maintained by computer 36. For example, if computer 36 receives package data with such an error signal, the computer may set up a package structure but designate the package structure as closed, or with an error flag, so that weight and barcode data are not assigned to the package structure.

Figure 5:
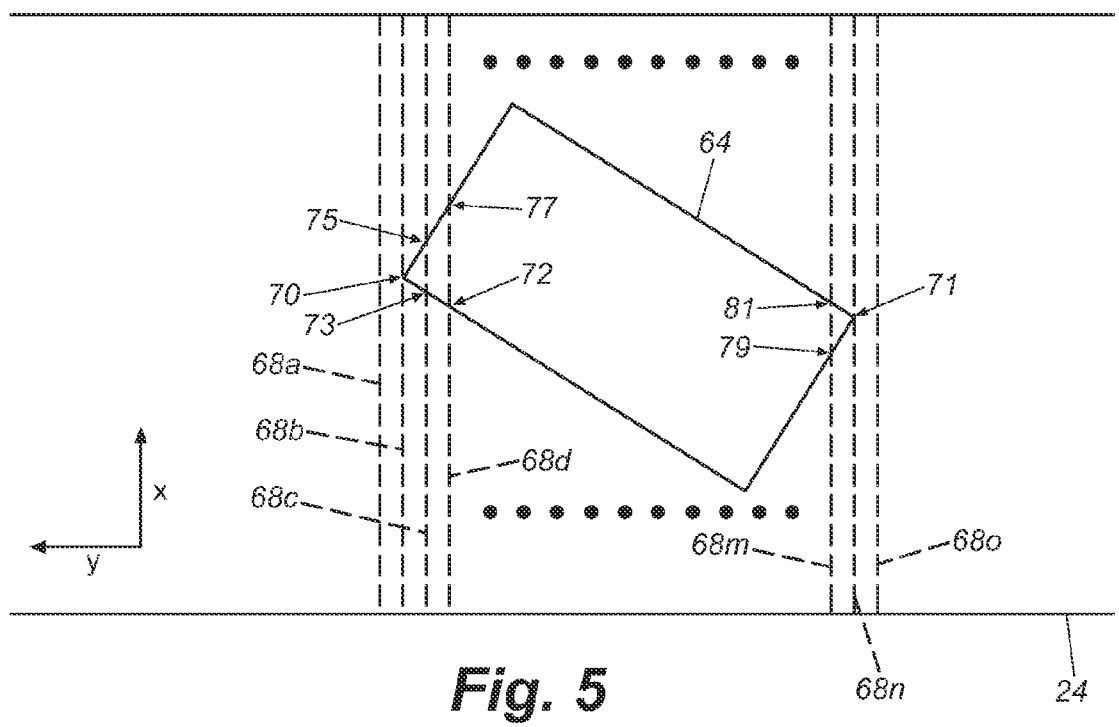
FIG. 5 is a schematic representation of packages on a conveyor belt under analysis of a dimensioner in an embodiment of the present invention.

Still referring to FIG. 5, uniform non-zero segments occur at points 70 and 71, and between points 73/75, 72/77, 79/81 and similar pairs of points (not shown) in the intermediate scans. The processor then identifies and stores the array position (i.e. the x-axis position defined by the dimensioner mirror's rotational position and the y-axis position defined by the initial tachometer value) of each segment endpoint (i.e. points 70, 71, 72, 73, 75, 77, 79, 81 and endpoints associated with segments in the intermediate scans). Due to the dimensioner processor's sampling rate, the endpoints do not precisely correspond to the package edges, but they do generally follow the edges, and the processor therefore examines the group of endpoints and identifies endpoints at which the alignment of sequential endpoints changes to such a degree as to indicate a package corner. Having identified all corners, the processor then locates each pair of corner points between which extends a group of generally aligned edge points and executes a line-fit algorithm to such edge points to define the package edge extending between the pair of corner points. The processor looks for any two pair of parallel lines that enclose a space. If the processor finds such lines, thereby identifying a discrete package, the dimensioner processor outputs to system computer 36 the array data points (i.e. height, x-axis position and initial tachometer value) in the present package structure that are bounded by the lines. It should be understood that line-fit algorithms may be defined that filter for aberrations in edge structures, such as loose tape or indentions, that may be predictable in a given system. As such algorithms should be understood, they are not described in further detail herein. If an irregularity in the edge lines is beyond the filters' predictable parameters, or if the algorithm is otherwise unable to define two pair of parallel lines that enclose a space, the dimensioner processor sets a flag in the package record to notify the system processor that valid dimension data was not obtained. Computer 36 then does not assign weight data to its corresponding package structure.

Thus, system computer 36 receives a series of data points, each including a height value, an initial tachometer value, and a scan position value that identifies the lateral position at which the height value occurred on the belt (i.e. in the x-direction).

In another preferred embodiment, the dimensioner does not send to computer 36 all array data associated with a package structure but rather outputs to the system computer only the height, initial tachometer values and scan position values of the package corners. As described below, computer 36 needs to know only the extent of the package's position in the belt's longitudinal (y axis) and, depending on the embodiment, transverse (x axis) directions in order to determine whether and how to acquire package weight. Since, in the present embodiment, the conveyor carries rectangular packages, the corners define package's perimeter, and thus the perimeter corner information is sufficient without data otherwise describing the package's edges or interior area, although it should be understood that edge or other data may be provided when the system is used to process items with differently-shaped perimeters. Height data for the corner points is sufficient to describe the package's height, as it is assumed the package has a uniform height within its perimeter, although it should be understood that height data itself may be omitted, for example where the host computer system does not rely on height in confirming proper invoicing. The dimensioner preferably calculates the package's length, height and width and includes this data in the information to the system computer.

Figure 6:
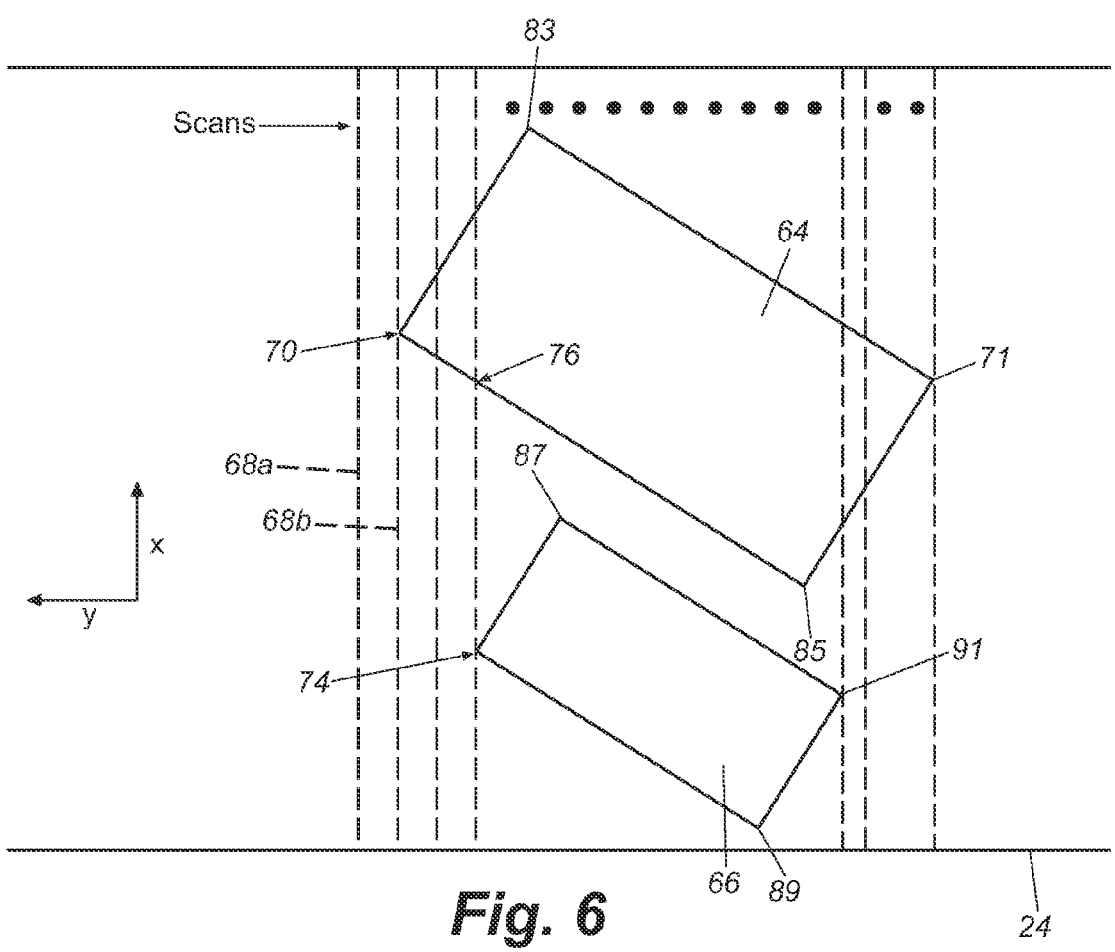
FIG. 6 is a schematic representation of packages on a conveyor belt under analysis of a dimensioner in an embodiment of the present invention.

The algorithm identifies multiple packages proximate each other. Referring to FIG. 6, for example, and assuming the system starts from a condition in which no package structure is open, the dimensioner processor opens a new package structure upon detecting point 70 in scan 68*b* and thereafter identifies corner points 70, 71, 74, 83, 85, 87, 89 and 91, in the same manner as described above with respect to FIG. 5. Having identified all corners, the processor then locates each pair of corner points between which extends a group of generally aligned edge points and executes a line-fit algorithm to such edge points to define the package edge extending between the pair of corner points. In the example shown in FIG. 6, the processor finds groups of parallel lines that enclose two separate spaces, respectively corresponding to packages 64 and 66. The dimensioner processor creates, and outputs to system computer 36, two separate package structures corresponding to the two discrete enclosed spaces, each package structure including the height value, initial tachometer value and scan position value of each data point enclosed with the package structure's respective space. Again, in alternatively preferred embodiments, the dimensioner processor outputs to the system computer only the height, initial tachometer and scan position values of the corners for each package structure.

Figure 7:
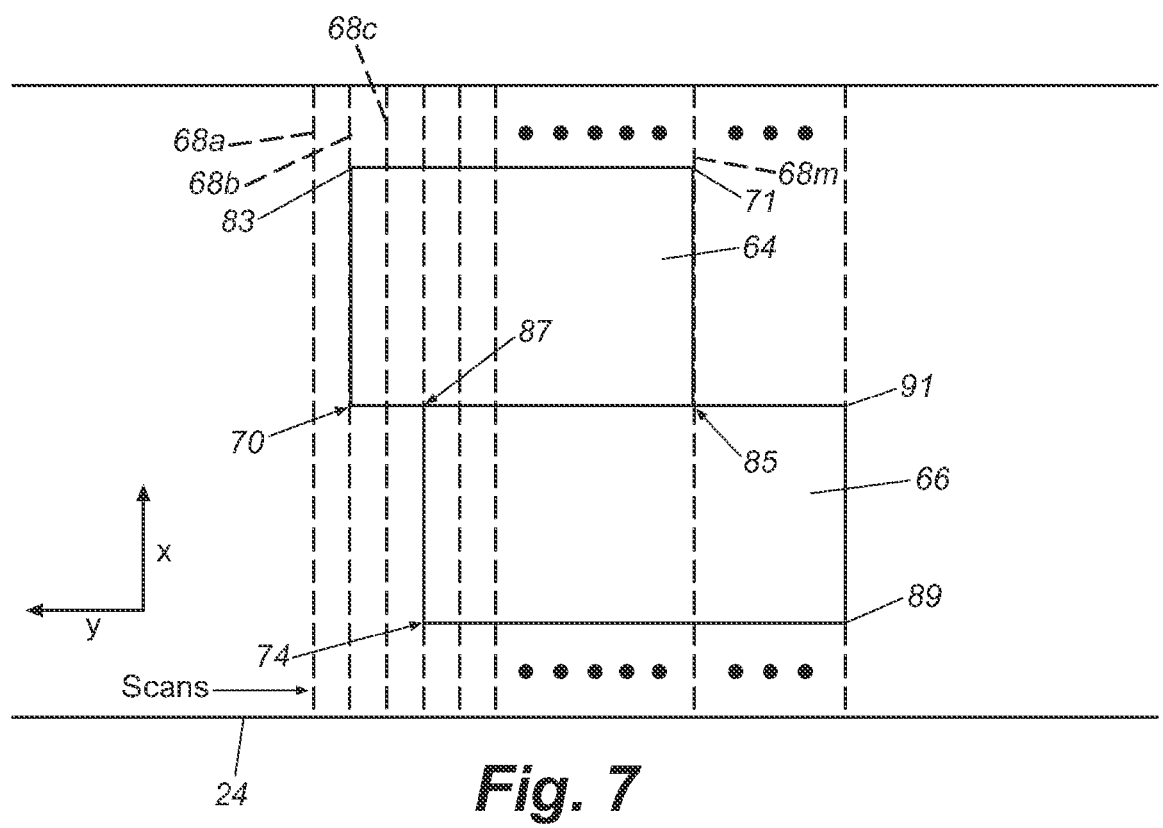
FIG. 7 is a schematic representation of packages on a conveyor belt under analysis of a dimensioner in an embodiment of the present invention.

Referring to FIG. 7, and assuming packages 64 and 66 are of different heights and that the system starts from a condition in which no package structure is open, the dimensioner processor opens a new package structure at point 70 in scan 68*c* and thereafter identifies corner points 70, 71, 74, 83, 85, 87, 89 and 91, as described above with respect to FIGS. 5 and 6. Because packages 64 and 66 are of different heights, the algorithm identifies edge points between corners 85 and 87.

The processor locates each pair of corner points between which extends a group of generally aligned edge points and executes a line-fit algorithm to such edge points to define the package edge extending between the pair of corner points. Even though edge lines can be defined between corners 70/87 and 87/85, these edge lines do not individually combine with any other one parallel line to enclose a space with another pair of parallel lines, but because the combination of these edge lines itself comprises a line and opposes a parallel line to enclose a space (corresponding to package 64) along with another pair of opposing parallel lines, the algorithm defines a line between corners 70 and 85. The processor identifies the four lines enclosing package 66 in a similar manner and then creates, and outputs to system computer 36, two separate package structures corresponding to the two discrete enclosed spaces, as described above.

Note that because packages 64 and 66 are aligned precisely so that the packages' front and back edges are aligned transversely across the belt, the system sees no edge points between corners 70/83, 74/87, 89/91 and 85/71 (a slight cant of the scan lines arising from the belt's longitudinal movement while the scan occurs is ignored for purposes of explanation). It should be understood, however, that the processor's algorithm may recognize such a condition based on the position of lines 83/71, 70/85, 87/91 and 74/89 and therefore fit lines between corners 70/83, 74/87, 89/91 and 85/71. Furthermore, if boxes 64 and 66 are of the same height, the processor may not see a height between corners 87/85, but it should be understood that the processor's algorithm can recognize such a condition based on the position of the other line segments to determine the positions of two sets of two pairs of parallel lines that enclose respective spaces. In the event packages 64 and 66 are of the same dimensions (including height) and are aligned with each other precisely so that the packages' front and back edges are continuous, it is possible that the dimensioner would detect the combination of the two packages as a single package, but such an occurrence should be rare in most instances.

As described above, because the array points in the x-axis scans correspond to lateral positions on belt 24 with respect to the items' path of travel, the stored array data in each package structure identifies each array value's (or each corner value's) x-axis position and initial tachometer value. Thus, the package structure defines the footprint of each package on the conveyor. It should be understood, however, that dimensioning algorithms are known in the art, and those skilled in the art should recognize that the procedure described herein is provided for purposes of example and explanation and that other methods could be utilized.

When computer 36 receives a new package data structure from the dimensioner, it creates a corresponding package data structure in its memory and compares the new package's position on the belt with the position of packages in all open (i.e. corresponding to packages being presently carried by the conveyor between the dimensioner and the scale) package structures in the system. Although the comparison is made with all open package structures in the presently described embodiments, it should be understood that other measures of proximity among packages could be used. If any data point in the new package structure (or in the package perimeter described by the data in the new package structure) has an initial tachometer value equal to the initial tachometer value of any point in any other open package structure (or the perimeter described by the data in that package structure), the corresponding packages are laterally adjacent to each other at least in part. Such packages are considered non-singulated in this embodiment, and computer 36 creates a non-singulated variable within both the new package data structure and the laterally adjacent structure to show that the corresponding packages are moving downstream on conveyor belt 24 in a non-singulated manner, such as packages 58 and 60 in FIG. 1. This non-singulated variable is a unique identifier indicating which packages are in a non-singulated group of packages.

Whether a package is determined to be non-singulated can also be affected by the longitudinal distance between two packages. For example, if the distance between two packages is shorter than the time needed for scale 22 to settle with a given package disposed on the scale, then, even though the packages do not overlap with respect to the direction of travel, the data structures for those packages are flagged as non-singulated since the scale's settlement time would not allow for an accurate measurement of the package's weight. Therefore, if the initial tachometer value of the most downstream data point in the new package structure is within a predefined difference (defined in tachometer pulses) from initial tachometer value of the most upstream data point in any other open package structure such that the corresponding packages could not be sufficiently isolated on the scale to obtain a valid weight, computer 36 flags both data structures as non-singulated. The predetermined minimum distance requirement can be programmed within system 10, allowing it to be changed when the system's capability or requirements change. One skilled in the art should appreciate that the predetermined minimum distance can vary depending on the configuration of the devices used in conjunction with system 10, such as scale 22.

The system processor sets in the package record for each package an open read window variable and a close read window variable for the scale. The open read window variable for the scale is equal to the tachometer value for the downstream-most point on the package, plus a known distance (in tachometer pulses) between the dimensioner and a predetermined position in the path of travel with respect to the scale. The close read window variable for the scale is equal to the tachometer value for the upstream-most point on the package, plus a known distance (in tachometer pulses) between the dimensioner and the predetermined position with respect to the scale. The predetermined scale position (which can be considered a scale RDV) is discussed in more detail below.

Still referring to FIG. 1, a package leaving the dimensioner moves downstream on conveyor belt 24a until reaching line 54, at which barcode scanner 32 scans the top of the package. A control processor in barcode scanner 32 continuously parses the signal, extracts any barcode data read from the package's top surface, and associates the extracted data with a variable identifying the laser scan line (i.e. the leg of the laser X pattern) by which the barcode data was read, the relative barcode count (i.e. the position in the identified scan line in which the barcode was read), and the accumulated tachometer value (tachometer values are accumulated by the barcode scanner processor from a synchronized value provided by the system processor).

System computer 36 receives the data from the barcode processor and subtracts from the barcode data's accumulated tachometer value the longitudinal offset defined by the barcode count and the RDV associated with the barcode scanner (i.e. the distance in tachometer pulses between lines 51 and 42). That is, the system computer effectively shifts the barcode data's longitudinal position back, as if the barcode had been read at dimensioner line 42. Based on the barcode's adjusted tachometer value and its lateral position (as defined by the laser scan line and lateral component of the relative barcode count), the system processor determines whether the barcode can fall within the four corners of the package defined by any open package structure, or any open package structure not flagged as having erroneous dimension data. As described above, and as should be understood in this art, the width and length of the X's in the X patterns seen by the barcode scanner depend on the height of the package from which the X's are reflected, and the package height is therefore needed to accurately determine the barcode's normalized tachometer value and lateral position. That is, in determining whether a barcode falls within the area of a given package, the system processor uses a ray tracing algorithm to properly define the barcode's position on that package, given the package's height. It is possible for this process to indicate the barcode is located on two packages, and in this event, the system may assign the barcode data to the package having the greater height or assign the barcode data to neither package. Otherwise, if the system processor determines that the barcode is located on one package, the processor assigns the barcode data to the package structure corresponding to that package. Barcode data that does not correspond to the position of an open package structure is not assigned to a package structure.

Alternatively, the dimensioner or the system processor increases the tachometer values of the four corners of each open package structure by the barcode reader's RDV, and the system processor does not adjust the tachometer value of received barcode data by the RDV. The system processor then compares the barcode reader position with the adjusted package positions in a manner similar to that discussed above.

Packages, such as package 58 and 60, continue to be moved by conveyor belts 24a-24c and may intersect other scanning beams, such as the beam denoted by numeral 56, from other scanners 32 if present. Computer 36 has the RDV of each such barcode scanner and associates barcode data with open package structures in the same manner.

A package leaving barcode scanner 32 moves downstream on conveyor belts 24a and 24c until reaching scale 22. As a package moves over the scale, the package weighs down onto the scale such that one or more load cells generate signals to the scale processor corresponding to the package's weight. The scale assembly has a photodetector (not shown) disposed along conveyor 24c immediately upstream from the scale. The scale processor monitors the photodetector's output signal and thereby determines when the package's front and back edges pass the photodetector. The scale receives the tachometer output and accumulates a global tachometer value from a synchronization signal provided by the system processor. By associating passage of the package's front and back edges by the photodetector with the tachometer data corresponding to the time those events occur, the scale processor determines the package's length. The rate at which the tachometer outputs pulses to the scale determines how fast the package is moving through its path of travel, and this, along with the package length, determines the time following its passage by the photodetector at which the package will have been on the scale a sufficient time for the scale to validly acquire the package's weight. The scale processor accordingly determines when valid weight data may be acquired for the package and acquires the weight data at that point.

The scale processor transmits weight data to the system processor when a package reaches a predetermined point in the path of travel following the scale. After acquiring the package's weight at a point based on the package's length and belt speed, the scale processor holds the weight data until a tachometer value associated with the weight data accumulates to a point indicating that the front edge of the package has moved from the scale photodetector to the predetermined point downstream of the scale. The predetermined point is defined so that a weight can be acquired for the longest package the system is expected to handle. The scale processor then outputs the weight data to the system processor.

Because the scale processor outputs weight data to the scale processor at the same point in the path of travel for each package, it is unnecessary for the scale processor to associate the weight data with a tachometer value when transmitting the information to the system processor. The system processor, however, relies on tachometer pulses to correctly associate weight data with a package record and so determines the accumulated tachometer value at the time the weight data is received from the scale processor. In this embodiment, the open read window and close read window scale variables for each open package structure are based upon an RDV equal to the distance between the dimensioner (at line 42) and the predetermined point downstream from the scale. Thus, the system processor compares the tachometer value associated with the received weight data with the open read window and close read window variables for the open package structures it maintains. If the tachometer value is between the open read window scale variable and close read window scale variable for any open package structure that is not flagged as non-singulated, the system processor assigns the weight data to that package record. Because the weight data is transmitted when a package's leading edge reaches the predetermined point, the tachometer value is expected to fall near the open read window scale variable for a given package structure, and so in an alternative embodiment, the system checks whether the tachometer value is at or within a predetermined threshold from the open read window scale variable, rather than within a range between the open and close read window scale variables. If the tachometer value does not fall within the open window and close window scale variables stored for any singulated open package record, the weight data is not assigned to a package record.

In an alternate embodiment, the scale processor outputs weight data, along with tachometer data corresponding to the distance between the scale photodetector and the point at which the weight data was acquired, to the system processor. The system processor receives the weight data and assigns to it the present global tachometer value. The open read window and close read window scale variables for each open package structure correspond to the distance between the dimensioner (at line 42) and the scale photodetector, i.e. the scale's RDV. Thus, the system processor subtracts from the tachometer value associated with the received weight data the tachometer offset value corresponding to the distance between the scale photodetector and the point at which the scale processor acquired the weight data and then compares the result with the open read window and close read window variables for the open package structures. If the resulting value is between the open read window scale variable and close read window scale variable for any open package structure that is not flagged as non-singulated, the system processor assigns the weight data to that package record. If the resulting tachometer value does not fall within the open window and close window scale variables stored for any singulated open package record, the weight data is not assigned to a package record.

Because computer 36 bases its decision to acquire weight data for a given package in part on the determination by dimensioner 28 whether the package is singulated with respect to other packages, it is unnecessary for human operators to monitor system 10 for non-singulated conditions and responsively interrupt weight data acquisition by manual means. Instead, system 10 automatically determines singulation and selectively acquires weight data based on that automatic determination.

A location (line 30) along conveyor belt 24b is identified downstream from scale 22 so that when the leading edge of a package reaches this location, it can be assumed that accurate weight data will have been acquired for the package if at all. When computer 36 determines a leading edge of a package has moved beyond line 30 (i.e. when a counter set by the system computer upon receiving the package dimension data from dimensioner 28 corresponding to the distance between lines 42 and 30 expires), computer 36 closes the package structure within system 10 and forwards the package structure to the host system computer. The host computer can then confirm whether shipping charges were correctly applied to the package based on its dimensions and weight as determined by system 10 or, in the event no dimension and/or weight data is assigned to the package, divert the package for manual examination or other processing if desired. If a package structure does not have all expected data (e.g. weight and barcode data) when the package reaches line 30, the system processor assigns an error variable to the package structure prior to transmission to the host.

The conveyor's speed has an impact on the minimum space required between packages for the packages to be considered singulated with respect to scale 22. As speed is increased, a greater distance between packages is generally required to settle the scale between weighs. The relationship between speed and package gap should be defined by the scale manufacturer and is preferably used by the operator of system 10 in setting the parameters for the processor of dimensioner 28 to thereby define the singulation criteria.

Figure 3:
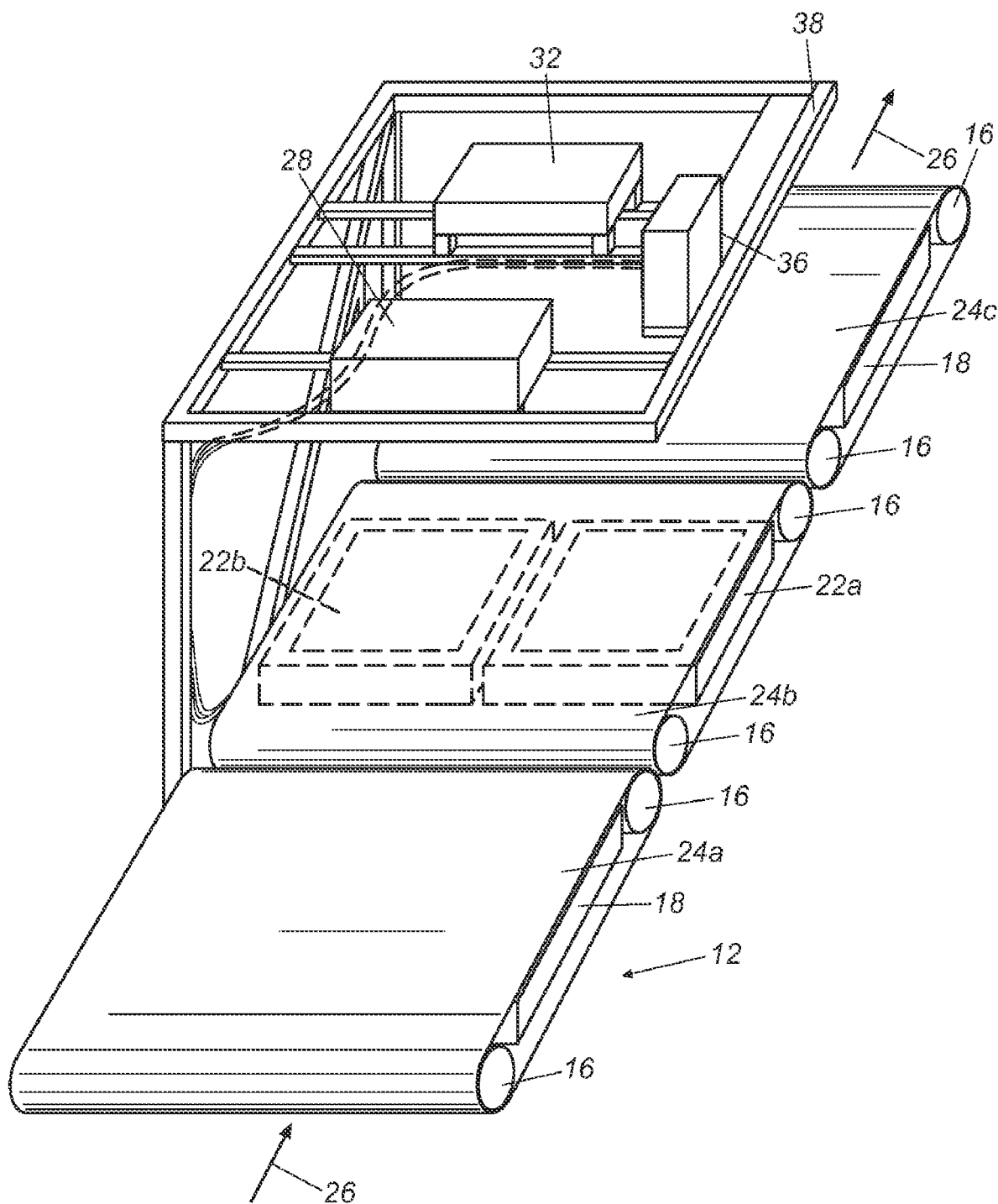
FIGS. 3, 3A and 4 are schematic representations of a dynamic dimensioning and weighing system in accordance with an embodiment of the present invention.
Figure 3A:
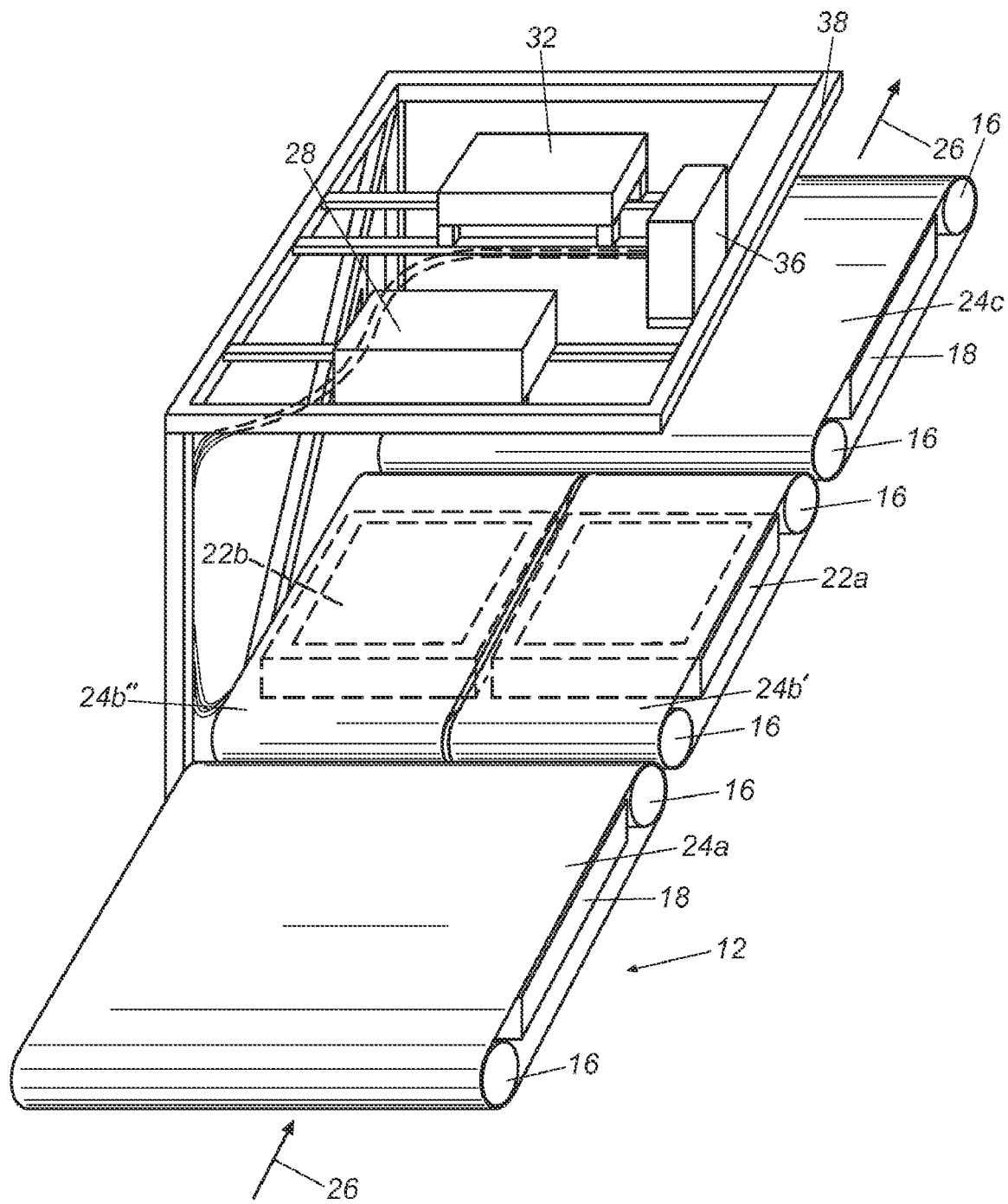

In another embodiment as shown in FIG. 3, scale 22 (FIG. 1) is replaced by two adjacent scales 22a and 22b. Scales 22a and 22b are connected to computer 36 such that each scale transmits to computer 36 a signal corresponding to weight applied to that scale in a manner similar to scale 22, as described above. Scales 22a and 22b are identical in structure and operation, and each occupies generally half the width of conveyor belt 24b. As shown in FIG. 3A, conveyor belt 24b may be comprised of separate, parallel driven belts 24b' and 24b", each passing over a respective scale 22a or 22b and each preferably driven by respective sets of rollers 16.

Computer 36 acquires weight data from scales 22a and 22b in a manner similar to that described above with respect to FIG. 1, except that weight data can be acquired for non-singulated packages in at least some instances. Each of the two scale assemblies has a proximity photodetector (not shown) immediately upstream from the respective scales. Each proximity photodetector is set to detect passage of packages only across the width of the scale to which the photodetector corresponds. Proximity photodetectors, and their operation, should be understood in this art and are therefore not discussed in further detail.

Each scale processor monitors its photodetector's output signal and thereby determines when a package's front and back edges pass the photodetector. The scale processors receive tachometer output, respectively determine when valid weight data may be acquired for the package on its scale, and acquire the weight data at that point. The scale processors transmit weight data to the system processor when the package leading edge, as determined based on the proximity photodetector signal and the tachometer signal, reaches a predetermined downstream point, as discussed above. Alternatively, the scale processors output the weight data, along with tachometer data corresponding to the distance between the photodetector and the point at which weight data was acquired, to the system processor, which adjusts the tachometer data to the photodetector position based on the scale's tachometer data.

The system processor receives the weight data from each scale and assigns to it the present global tachometer value. The open read window and close read window scale variables for each open package structure are based upon the distance between the dimensioner and the predetermined point downstream from the scales. Thus, the system processor compares the tachometer value associated with the received weight data with the open read window and close read window variables for the open package structures. If the tachometer value is between the open read window scale variable and close read window scale variable for any open package structure that is not flagged as non-singulated (i.e. a package structure for a singulated package), the system processor assigns the weight data to that package record.

A singulated package may pass over both scales, or just one. If the package passes over both scales, the two scale processors may transmit weight data to the system processor at approximately the same time or at slightly different times, depending on the package's orientation on the belt and the method by which the scales transmit weight data. Regardless, if the system processor detects valid weight data for the same singulated package from both scales, the processor sums the two weights and assigns the summed weight to the appropriate package structure.

If, however, the tachometer value falls within the open window and close window variables of an open package structure that is flagged as non-singulated, computer 36 examines the scan position values (i.e. lateral, or x-axis positions) of the package's perimeter. Corresponding lateral position values of the perimeter of the scale surface of each of scale 22a and 22b are stored in memory associated with computer 36. Computer 36 compares the lateral position values of the package's perimeter with the lateral position values of the scale perimeters and determines if the package is aligned entirely within the lateral boundaries of the scale 22a or scale 22b (i.e. the edges running along the sides of the respective scale 22a or 22b surface in the y axis direction, separated laterally from each other in the x-axis direction) from which the weight data was received. That is, computer 36 determines whether the package's widest lateral dimension is within the relevant scale's widest lateral dimension such that the package passes entirely over that scale and not the other. If so, and if there is no other open non-singulated package structure having:

i. downstream-most and upstream-most points
     (a) either of which is between the initial tachometer values of the downstream-most and upstream-most points of the first non-singulated package, or
     (b) both of which are outside the initial tachometer values of the downstream-most and upstream-most points of the first non-singulated package but either of which is within a predetermined distance of the nearest downstream-most or upstream-most point on the first package structure perimeter that is insufficient to allow the scale to settle at the given belt speed if both packages pass over the scale; and
  ii. perimeter scan position values overlapping the perimeter scan position values of the same scale on which the first package is disposed, computer 36 assigns the weight data from the relevant scale to the package structure for the first package and does not assign weight data from the other scale to that package structure. If weight data from the other scale meets the same test with respect to another package structure, its weight data is assigned to that other package structure. That is, if computer 36 determines that a non-singulated package is passing over one of scales 22a and 22b, but not the other, and that no other non-singulated package is or will be on the same scale at the same time as the first package or at a time close enough to the first package to prevent acquisition of weight data, computer 36 acquires weight data from that scale even though the package is non-singulated.

If the resulting tachometer value falls within the open window and close window variables of an open package structure that is flagged as non-singulated, but computer 36 determines that the non-singulated package passes over both scales, or if another non-singulated package is or will be on the same scale at the same time as the first package or at a time close enough to the first package to prevent acquisition of weight data, computer 36 does not assign the weight data to a package structure.

In another preferred embodiment, scales 22a and 22b are offset from each other in the longitudinal (i.e. y) direction. Each scale still covers only its respective half of the width of the belt, but each operates with a photodetector that detects passage of objects at any point across the width of the belt. The system maintains open and close read window variables specific to each scale, but otherwise the system operates in the same manner as discussed above. Note that while a package that is entirely on one side of the belt will trigger a weight measurement by the scale on the other side, this should result only in a zero weight corresponding to that package and should not negatively affect system operation.

In still further embodiments, signals from the system processor replace the proximity photodetectors, which are omitted. When the dimensioner transmits a package structure to the system processor, the system processor examines the package's perimeter and separates the perimeter into that part disposed on one lateral half of the belt and that part disposed on the other half of the belt. That is, the system processor determines what part of the package perimeter will pass over scale 22a and what part will pass over scale 22b. The system processor establishes a start photodetector variable and an end photodetector variable for each of the two parts of the perimeter. The start photodetector variable corresponds to the downstream-most point on that given side, or part, of the perimeter, whereas the end photodetector variable corresponds to the upstream-most point on the given perimeter side. Each variable is set to the RDV for the scale over which its corresponding perimeter part will pass, offset by the longitudinal distance between its corresponding point and the downstream-most point on the package. For example, assume a package extends onto both sides of the belt, so that one front corner and one back corner of the package is on each side of the belt, and that the package is disposed at an angle with respect to the belt's centerline so that one of the package corners is the downstream-most point in the package. Assume also that this corner passes over scale 22a. The start photodetector variable for the "22a" part of the package is the RDV for scale 22a. The end photodetector variable for the 22a part of the package is the RDV for scale 22a plus the longitudinal distance (in tachometer pulses) between the downstream-most corner and the upstream-most point on the 22a part of the package perimeter. The start photodetector variable for the "22b" part of the package perimeter is the RDV for scale 22b, plus the longitudinal distance between the downstream-most corner on the 22a part of the package and the downstream-most point in the 22b part of the package. The end photodetector variable for the 22b part of the package is the RDV for scale 22b, plus the longitudinal distance between the downstream-most corner on the 22a part and the upstream-most point on the 22b part of the perimeter.

At each incoming tachometer pulse, the system processor decrements both the start and end photodetector variables for each part of the package perimeter, until each variable reaches zero. Thus, when the start photodetector variable for the 22a part of a package perimeter reaches zero, the downstream-most point on the part of the package passing over scale 22a has reached the position in front of the scale at which the photodetector would otherwise be disposed. When the end photodetector variable for the 22a part of the package perimeter decrements to zero, the upstream-most point on the part of the package passing over scale 22a has reached the "photodetector" position. When the start photodetector variable for the 22b part of a package perimeter reaches zero, the downstream-most point on the part of the package passing over scale 22b has reached the position in front of scale 22b at which the photodetector would otherwise be disposed. When the end photodetector variable for the 22b part of the package perimeter decrements to zero, the upstream-most point on the part of the package passing over scale 22b has reached the photodetector position.

When a start photodetector variable for either scale 22a or scale 22b decrements to zero, the system processor checks to see if there is any other package structure having a zero start photodetector variable and a non-zero end photodetector variable for the same scale. If not, the system processor sends a start photodetector signal to that scale's processor, which reacts to the signal as it would to a signal from the proximity photodetector described above responsive to a package leading edge.

If such a package record does exist, however, there is an overlapping package with a leading edge ahead of the present package. Under these circumstances, the proximity photodetector would not have been able to distinguish the leading edge of the present package and would not have sent a signal to the scale photodetector. The system processor therefore does not send a signal to the scale processor in response to the zero-level of the start photodetector variable.

When an end photodetector variable for either scale 22a or scale 22b decrements to zero, the system processor checks to see if there is any other package structure having a zero start photodetector variable and a non-zero end photodetector variable for the same scale. If not, the system processor sends an end photodetector signal to that scale's processor, which reacts to the signal as it would to a signal from the proximity photodetector described above responsive to a package back edge.

If such a package record does exist, however, there is an overlapping package with a back edge behind the back edge of the present package. Under these circumstances, the proximity detector would not have been able to distinguish the back edge of the present package and would not have sent a signal to the scale photodector. The system processor therefore does not send a signal to the scale processor in response to the zero-level of the end photodetector variable.

The system otherwise operates in the same manner as the embodiment discussed above with respect to FIG. 3.

In another preferred embodiment, the system processor does not distinguish between the two parts of a package perimeter in issuing start and end photodetector signals to the scale processors. The system processor examines each package's perimeter when the package data is received from the dimensioner and establishes a start photodetector variable and an end photodetector variable for the package structure as a whole. The start photodetector variable corresponds to the downstream-most point on the entire package perimeter and is equal to the common RDV for side-by-side scales 22a and 22b. The end photodetector variable corresponds to the upstream-most point on the entire package perimeter, plus the longitudinal distance between the downstream-most point and the upstream-most point (i.e. the package's length).

When the start photodetector variable for an open package structure decrements to zero, the system processor checks to see if there is any other package structure having a zero start photodetector variable and a non-zero end photodetector variable for the same scale. If not, the system processor sends a start photodetector signal to both scale processors, which react to the signal as they would to signals from their proximity photodetectors described above responsive to a package leading edge.

If such a package record does exist, however, the system processor does not send start photodetector signals to the scale processors.

When an end photodetector variable for the open package structure decrements to zero, the system processor checks to see if there is any other package structure having a zero start photodetector variable and a non-zero end photodetector variable for the same scale. If not, the system processor sends an end photodetector signal to each scale processor, which reacts to the signal as it would to a signal from the proximity photodetector described above responsive to a package back edge.

If such a package record does exist, however, the system processor does not send end photodetector signals to the scale processors.

The system otherwise operates in the same manner as the embodiment discussed above with respect to FIG. 3. The use of the same start and end photodetector variables for both scales 22a and 22b affects the scales' timing in weighing the portions of the packages passing over the scales, but because the overall length of each package should be within the maximum length that can be weighed by the scales in any event, the validity of the weight data is not affected.

In a still further embodiment, when an a start photodetector variable for either scale 22a or scale 22b (or both, if the start and end variables are defined for each package structure as a whole, rather than corresponding to the respective parts of the package structure passing over the scales) decrements to zero, the system processor checks to see if there is any other open package structure having i. downstream-most and upstream-most points
        (a) either of which is between the initial tachometer values of the downstream-most and upstream-most points of the first package, or
        (b) both of which are outside the initial tachometer values of the downstream-most and upstream-most points of the first package but either of which is within a predetermined distance of the nearest downstream-most or upstream-most point on the first package structure perimeter that is insufficient to allow the scale to settle at the given belt speed if both packages pass over the scale; and
    ii. perimeter scan position values overlapping the perimeter scan position values of the relevant scale.

If so, the system processor does not send a start photodetector signal to that scale's processor and does not send an end photodetector signal when the package's end photodetector variable decrements to zero. If there is no such open package structure, however, the system processor sends a start photodetector signal to the relevant scale's processor, which reacts to the signal as it would to a signal from the proximity photodetector described above responsive to a package leading edge. In this instance, the system processor sends the scale processor an end photodetector signal when the package's end photodetector variable decrements to zero. Because the system processor checked for interfering packages at the start photodetector variable, it is not necessary to check again at the package end. The system otherwise operates in the same manner as the embodiment discussed above with respect to FIG. 3.

Figure 4:
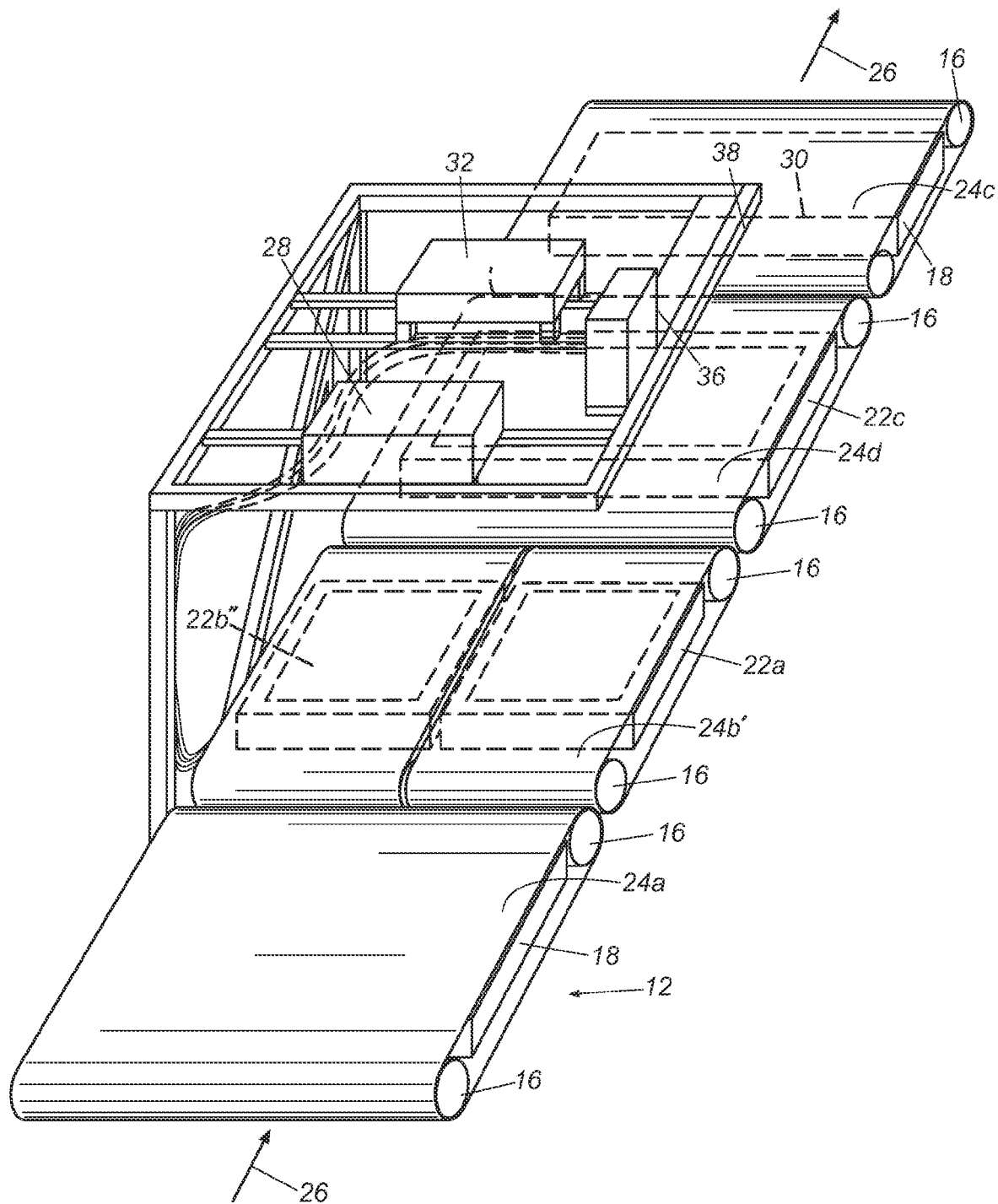

In another embodiment as shown in FIG. 4, an additional scale (22c) is located at the underside of conveyor belt 24d directly downstream from side-by-side adjacent scales 22a and 22b. Scale 22c spans substantially the entire width of conveyor belt 24d similar to scale 22 in FIG. 1 and has a control processor that operates and communicates with computer 36 in the same manner.

The respective control processors in each of scales 22a-22c continuously parse the weight signals provided by the one or more load cells in the respective scales and extract any weight data therefrom. The single-scale assembly has a photodetector (not shown) disposed along conveyor belt 24d immediately upstream from scale 22c. The dual-scale assembly has respective proximity photodetectors disposed along conveyors 24b' and 24b'' immediately upstream from respective scales 22a and 22b. Each scale processor monitors its photodetector's output signal and thereby determines when a package's front and back edges pass the photodetector. The scale processors receive the tachometer output and respectively determine when valid weight data may be acquired for a package on the scale and acquire the weight data at that point. The scale processors transmit weight data to the system processor when the package leading edges, as determined from the scale photodetector signals, reach respective predetermined downstream points, as discussed above. The system processor receives the weight data and assigns it to the present global tachometer value. The system processor compares the tachometer value associated with the received weight data with the open and close read window variables for the open package structures. If the tachometer value falls within the open read window variable and close read window variable of any open package structure that is not flagged as non-singulated (i.e. if the package is singulated) or as having an error, and if the weight data was received from scale 22c, the system processor assigns the weight data to that package record.

If the tachometer value falls within the open read window variable and close read window variable of any open package structure that is flagged as non-singulated, and if the weight data was received from scale 22c, the weight data is not assigned to a package structure.

If the tachometer tachometer value falls within the open read window variable and close read window variable of an open package structure that is flagged as non-singulated, and if the weight data was received from either of scales 22a or 22b, computer 36 examines the scan position values (i.e. lateral, or x-axis positions) of the package's perimeter. Corresponding lateral position values of the perimeter of the scale surface of each of scale 22a and 22b are stored in memory associated with computer 36. Computer 36 compares the lateral position values of the package's perimeter with the lateral position values of the two scale perimeters and determines if the package is aligned entirely within the lateral boundaries of the scale 22a or scale 22b from which the weight data was received. That is, computer 36 determines whether the package's widest lateral dimension is within the relevant scale's widest lateral dimension such that the package passes entirely over that scale and not the other. If so, and if there is no other open non-singulated package structure having:
  i. downstream-most and upstream-most points
     (a) either of which is between the initial tachometer values of the downstream-most and upstream-most points of the first non-singulated package, or
     (b) both of which are outside the initial tachometer values of the downstream-most and upstream-most points of the first non-singulated package but either of which is within a predetermined distance of the nearest downstream-most or upstream-most point on the first package structure perimeter that is insufficient to allow the scale to settle at the given belt speed if both packages pass over the scale; and
  ii. perimeter scan position values overlapping the perimeter scan position values of the same scale on which the first package is disposed, computer 36 assigns the weight data from the relevant scale to the package structure for the first package and does not assign the weight data from the parallel scale to that package structure. If weight data from the parallel scale meets the same test with respect to another package structure, its weight data is assigned to that other package structure. That is, if computer 36 determines that a non-singulated package is passing over one of scales 22a and 22b, but not the other, and that no other non-singulated package is or will be on the same scale at the same time as the first package or at a time close enough to the first package to prevent acquisition of weight data, computer 36 acquires weight data from that scale even though the package is non-singulated.

If the tachometer value falls within the open window variable and the close window variable of an open package structure that is flagged as non-singulated, and if the weight data was received from scales 22a or 22b, and if computer 36 determines that the non-singulated package passes over both scales 22a and 22b, or if another non-singulated package is or will be on the same scale 22a or 22b at the same time as the first package or at a time close enough to the first package to prevent acquisition of weight data, computer 36 does not assign the weight data to a package structure.

If the tachometer value falls within the open window variable and the close window variable of an open package structure that is not flagged as non-singulated, and if the weight data was received from scales 22a or 22b, the weight data is not assigned to a package structure.

As described above with respect to the embodiment of FIG. 3, parallel scales 22a and 22b may be longitudinally offset with respect to each other, and, further, the proximity photodetectors associated with scales 22a and 22b may be replaced by signals from the system processor mimicking the photodetectors' operation.

Still referring to FIG. 4, a location (line 30) along conveyor belt 24c is identified downstream from scale 22c so that when the leading edge of a package passes beyond this location, it is known that weight data has been acquired for that package (if possible). When computer 36 determines a package has moved beyond line 30 (i.e. when a counter set by the system computer upon receiving the package dimension data from dimensioner 28 corresponding to the distance between lines 42 and 30 expires), computer 36 closes the package structure within system 10 and forwards the package structure to the host system computer. The host computer can then confirm whether shipping charges were correctly applied to the package based on its dimensions and weight as determined by system 10 or, if no dimension and/or weight data is assigned to the package structure, divert the package for manual examination or other processing if desired.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. An apparatus for measuring the weight of items on a conveyor comprising:
a scale that generates a first signal corresponding to the weight of said items as they pass over the scale;
a moveable platform that transports the items to the scale, said moveable platform generating a second signal corresponding to a position of the items in relation to said scale;
a dimensioner that examines the items transported on the moveable platform and generates a third signal representative of whether the items are singulated or nonsingulated;
memory in which said first, said second and said third signals are stored;
a processor operatively connected to said scale, said dimensioner, said memory, and said moveable platform,
wherein said processor receives said second and said third signals and determines, based on said second and third signals, whether to associate said first signal with information stored in said memory about a particular said item based upon whether the particular item is singulated or nonsingulated.

2. An apparatus for measuring the weight of items on a conveyor, comprising:
a conveyor that moves the items in a direction in a path of travel;
a scale disposed in the path of travel so that the scale receives the items moving on the conveyor and outputs a first signal corresponding to a weight of said items that are received by the scale;
a dimensioner disposed proximate the conveyor that detects the items moving on the conveyor and that outputs a second signal containing information describing a location of a boundary of each first item in the path of travel and relative to locations of other said items in the path of travel proximate the first item;
a processor that receives the first signal and the second signal and that
determines, based on the location of the boundary of the first item in the path of travel, when the first signal corresponds to receipt of the first item by the scale,
detects, based on the location of the boundary of the first item in the path of travel relative to respective locations of boundaries of other said items proximate the first item, whether the first item longitudinally overlaps, with respect to the direction, a second said item disposed in the path of travel,
acquires a weight from the first signal,
assigns the acquired weight to a record corresponding to the first item based upon determination that the first item has moved in the path of travel to the scale so that the first signal corresponds to receipt of the first item by the scale and that the first item does not longitudinally overlap the second item, and
upon determining that the first item has moved in the path of travel to the scale so that the first signal corresponds to receipt of the first item by the scale and that the first item longitudinally overlaps the second item, does not assign the acquired weight to the record for the first item.

3. The apparatus as in claim 2, wherein the scale extends laterally, with respect to the direction, substantially across the path of travel.

4. The apparatus as in claim 2, including a first said scale and a second said scale laterally offset from the first scale with respect to the direction.

5. The apparatus as in claim 4, wherein a widest lateral dimension of the first scale with respect to the direction does not overlap a widest lateral dimension of the second scale with respect to the direction.

6. The apparatus as in claim 5, wherein the first scale and the second scale are laterally adjacent to each other.

7. The apparatus as in claim 5, including a third said scale longitudinally offset from the first scale and the second scale with respect to the direction, wherein the third scale extends laterally, with respect to the direction, substantially across the path of travel.

8. An apparatus for measuring the weight of items on a conveyor, comprising:
a conveyor that moves the items in a direction in a path of travel;
a scale disposed in the path of travel so that the scale receives the items moving on the conveyor and outputs a first signal corresponding to a weight of said items that are received by the scale;
a dimensioner disposed proximate the conveyor, the dimensioner having a signal source that outputs a second signal with which the items interact as the items move along the path of travel so that when a first said item interacts with the second signal, the second signal carries information corresponding to at least one spatial dimension of the first item, wherein the dimensioner produces a third signal that includes the information; and
a processor that
receives the first signal and the third signal,
determines, based on the information, a location of a boundary of the first item in the path of travel and relative to locations of boundaries of other said items in the path of travel proximate the first item,
determines, based on the location of the boundary of the first item in the path of travel, when the first signal corresponds to receipt of the first item by the scale, and
detects, based on the location of the boundary of the first item with respect to the locations of boundaries of other said items proximate the first item, a first condition in which the boundary of the first item overlaps, relative to the direction, a boundary of a said other item that is received by the scale and a second condition in which the boundary of the first item does not overlap, relative to the direction, the boundary of a said other item that is received by the scale,
wherein, upon determining that the first signal corresponds to receipt of the first item by the scale, the processor associates a weight defined by the first signal with a record corresponding to the first item based upon detection of the second condition and does not associate the weight defined by the first signal with the record when the processor detects the first condition.

9. The apparatus as in claim 8, wherein the processor is comprised of a first processor housed by the dimensioner and a second processor remote from the dimensioner and in communication with the first processor and the scale, wherein the first processor receives the third signal and determines therefrom the location of the boundary of the first item in the path of travel, and the second processor receives from the first processor the location of the boundary of the first item in the path of travel, receives the first signal, determines when the first signal corresponds to receipt of the first item by the scale, and detects the first condition and the second condition.

10. The apparatus as in claim 8, wherein the processor establishes a respective said record for each item in the path of travel upon receiving a said second signal indicating presence of said item in the path of travel.

11. The apparatus as in claim 8, wherein the conveyor outputs a fourth signal to the processor, the fourth signal indicating a rate at which the items move in the path of travel, wherein the processor determines when the first signal corresponds to receipt of the first item by the scale based on a value of the fourth signal when the first item is at a predetermined reference position in the path of travel and a value of the fourth signal when the processor receives the first signal.

12. The apparatus as in claim 8, wherein the scale extends laterally, with respect to the direction, substantially across the path of travel.

13. The apparatus as in claim 8, including a first said scale and a second said scale laterally offset from the first scale with respect to the direction.

14. The apparatus as in claim 13, wherein a widest lateral dimension of the first scale with respect to the direction does not overlap a widest lateral dimension of the second scale with respect to the direction.

15. The apparatus as in claim 14, wherein the first scale and the second scale are laterally adjacent to each other.

16. The apparatus as in claim 15, including a third said scale longitudinally offset from the first scale and the second scale with respect to the direction, wherein the third scale extends laterally, with respect to the direction, substantially across the path of travel.

17. An apparatus for measuring the weight of items on a conveyor, comprising:
a conveyor that moves the items in a direction in a path of travel;
a scale disposed in the path of travel so that the scale receives the items moving on the conveyor and outputs a first signal corresponding to a weight of said items that are received by the scale;
a dimensioner disposed proximate the conveyor, the dimensioner having a signal source that outputs a second signal with which the items interact as the items move along the path of travel so that when a first said item interacts with the second signal, the second signal carries information corresponding to at least one spatial dimension of the first item, wherein the dimensioner produces a third signal that includes the information;
a first processor that receives the third signal and determines, based on the information, a location of a boundary of the first item in the path of travel; and
a second processor that
receives the first signal,
receives from the first processor the location of the boundary of the first item in the path of travel and establishes a record for the first item,
determines, based on the location of the boundary of the first item in the path of travel, when the first signal corresponds to receipt of the first item by the scale,
detects, based on the location of the boundary of the first item in the path of travel relative to respective locations of boundaries of other said items proximate the first item, whether the first item longitudinally overlaps, with respect to the direction, a second said item disposed in the path of travel or is separated longitudinally from a said second item within a predetermined longitudinal distance that inhibits acquisition of weight of the first item from the first signal, and
acquires a weight of the first item from the first signal, and assigns the acquired weight to the record for the first item, when the second processor determines that
the first item has moved in the path of travel to the scale so that the first signal corresponds to receipt of the first item by the scale,
the first item does not longitudinally overlap the second item, and
the second item is not within the predetermined longitudinal distance from the first item.

18. The apparatus as in claim 17, wherein the scale extends laterally, with respect to the direction, substantially across the path of travel.

19. The apparatus as in claim 17, including a first said scale and a second said scale laterally offset from the first scale with respect to the direction.

20. The apparatus as in claim 19, wherein a widest lateral dimension of the first scale with respect to the direction does not overlap a widest lateral dimension of the second scale with respect to the direction.

21. The apparatus as in claim 20, wherein the first scale and the second scale are laterally adjacent to each other.

22. The apparatus as in claim 21, including a third said scale longitudinally offset from the first scale and the second scale with respect to the direction, wherein the third scale extends laterally, with respect to the direction, substantially across the path of travel.

23. The apparatus as in claim 22, wherein
the second processor acquires a weight of the first item from the first signal from the first scale, does not acquire a weight of the first item from the second scale or the third scale, and assigns the acquired weight from the first scale to the record for the first item, when
the first item has moved in the path of travel to the first scale so that the first signal from the first scale corresponds to weight of the first item,
the first item does not longitudinally overlap the second item disposed in the path of travel so that the second item is received by the first scale,
the last-mentioned second item is not within the predetermined longitudinal distance from the first item, and
the first item longitudinally overlaps a third said item or is within the predetermined longitudinal distance from the third item, wherein the third item is not received by the first scale in the path of travel,
the second processor acquires a weight of the first item from the first signal from the second scale, does not acquire a weight of the first item from the first scale or the third scale, and assigns the acquired weight from the second scale to the record for the first item, when
the first item has moved in the path of travel to the second scale so that the first signal corresponds to weight of the first item,
the first item does not longitudinally overlap the second item disposed in the path of travel so that the second item is received by the second scale,
the last-mentioned second item is not within the predetermined longitudinal distance from the first item, and
the first item longitudinally overlaps a fourth said item or is within the predetermined longitudinal distance from the fourth item, wherein the fourth item is not received by the second scale in the path of travel, and the second processor acquires a weight of the first item from the first signal from the third scale, does not acquire a weight of the first item from the first signal from the first scale or the second scale, and assigns the acquired weight from the third scale to the record for the first item, when the first item has moved in the path of travel to the third scale so that the first signal from the third scale corresponds to weight of the first item, the first item does not longitudinally overlap the second item disposed in the path of travel so that the second item is received by the third scale, and the last-mentioned second item is not within the predetermined longitudinal distance from the first item.

24. A method for measuring the weight of items being moved on a conveyor in a direction in a path of travel, comprising the steps of:

providing a scale disposed in the path of travel so that the scale receives the items moving on the conveyor and outputs a first signal corresponding to a weight of said items that are received by the scale;

determining at least one spatial dimension of a first said item;

determining, based on the at least one spatial dimension, a location of a boundary of the first item in the path of travel and relative to locations of boundaries of other said items in the path of travel proximate the first item;

determining, based on the location of the boundary of the first item in the path of travel, when the first signal corresponds to receipt of the first item by the scale;

detecting, based on the location of the boundary of the first item with respect to the locations of boundaries of other said items proximate the first item, a first condition in which the boundary of the first item overlaps, relative to the direction, a boundary of a said other item that is received by the scale and a second condition in which the boundary of the first item does not overlap, relative to the direction, the boundary of a said other item that is received by the scale; and upon determining that the first signal corresponds to receipt of the first item by the scale, associating a weight defined by the first signal with a record corresponding to the first item based upon detection of the second condition and not associating the weight defined by the first signal with the record upon detecting the first condition.

* * * * *